(12) United States Patent
Jung et al.

(10) Patent No.: US 8,750,941 B2
(45) Date of Patent: Jun. 10, 2014

(54) MOBILE TERMINAL AND METHOD OF CONTROLLING MOBILE TERMINAL

(75) Inventors: Jongchan Jung, Seoul (KR); Handeck Koh, Seoul (KR); Jihong Min, Seoul (KR); Hakjun Choi, Seoul (KR); Jinho Hwang, Seoul (KR); Zunsu Kim, Seoul (KR); Jinwook Ahn, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 13/401,761

(22) Filed: Feb. 21, 2012

(65) Prior Publication Data

US 2012/0238325 A1 Sep. 20, 2012

(30) Foreign Application Priority Data

Mar. 16, 2011 (KR) .......................... 10-2011-0023223
Apr. 12, 2011 (KR) .......................... 10-2011-0033935

(51) Int. Cl.
 *H04M 1/00* (2006.01)
(52) U.S. Cl.
 USPC ........................................ 455/566; 455/550.1
(58) Field of Classification Search
 CPC ...................... H04M 1/72519; H04M 1/72569; H04W 52/0264; H04W 52/0274; G06F 3/0482; G06F 1/1613
 USPC .............................................. 455/566, 550.1
 See application file for complete search history.

(56) References Cited

U.S. PATENT DOCUMENTS

| | | | |
|---|---|---|---|
| 7,660,558 B2 * | 2/2010 | Borcic et al. | 455/3.06 |
| 2005/0176460 A1 * | 8/2005 | Hamanaga et al. | 455/550.1 |
| 2006/0229099 A1 | 10/2006 | Chen et al. | |

FOREIGN PATENT DOCUMENTS

EP 2207332 7/2010

* cited by examiner

*Primary Examiner* — Chuong A Ngo
(74) *Attorney, Agent, or Firm* — Lee, Hong, Degerman, Kang & Waimey

(57) ABSTRACT

A mobile terminal and controlling method of a mobile terminal are provided. The present invention may include executing a content if an command for executing the content is received, detecting whether an operation of the content is ended in an uncompleted status, creating an object to which a function of re-executing the content from an operation ended point of the content is assigned if the operation of the content is ended in the uncompleted status, displaying the created object, and re-executing the content corresponding to a selected object if the displayed object is selected.

19 Claims, 32 Drawing Sheets

(a)

(b)

MOBILE TERMINAL AND METHOD OF CONTROLLING MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0023223, filed on Mar. 16, 2011, and 10-2011-0033935, filed on Apr. 12, 2011, the contents of all of which are hereby incorporated by reference herein in their entirety.

FIELD OF THE INVENTION

The present invention relates to a mobile terminal, and more particularly, to a mobile terminal and a method of controlling the mobile terminal.

DESCRIPTION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display.

Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into hand-held terminals and vehicle mount terminals according to ability for hand-carry.

There are ongoing efforts to support and increase the functionality of mobile terminals. Such efforts include software and hardware improvements, as well as changes and improvements in the structural components which form the mobile terminal. Since a terminal may be implemented as a multimedia device, the capacity of an internal or external memory of the terminal is increased to enable a mass storage of various contents.

Meanwhile, while content loaded in a terminal is operating, if a corresponding operation is unexpectedly ended by a user or an external factor before the operation is uncompleted, it may be inconvenient for the user to activate the content and to search for the content ended point one-by-one in order to resume operation of the content from the ended point. For instance, while a video is being played, if playback of the video is suddenly ended before the playback is completed, a user may have to play the video from the beginning and to search for the play ended point.

SUMMARY OF THE INVENTION

Accordingly, the present invention is directed to a mobile terminal and controlling method of a mobile terminal that substantially obviate one or more problems due to limitations and disadvantages of the related art.

An object of the present invention is to provide a mobile terminal and controlling method of a mobile terminal, by which the following may be achieved. While a content is operating, if an operation of the content is ended, a widget is provided for resuming the content from the operation ended point. If the widget is selected, the content may be resumed from the operation ended point.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a memory configured to store at least one content, a display unit configured to display an operating screen of the content if the content is activated, a controller configured to create an object by which re-activation the content from an operation ended point of the content is facilitated if the operation of the content is ended in an uncompleted status, to store the created object in the memory, to display the created object on the display unit, and to reactivate the content corresponding to a selected object if the displayed object is selected.

In another aspect of the present invention, a method of controlling a mobile terminal according to the present invention may include executing content if an command for executing the content is input, detecting whether an operation of the content is ended in an uncompleted status, creating an object by which a function of re-executing the content from an operation ended point of the content is facilitated if the operation of the content is ended in an uncompleted status, displaying the created object, and re-executing the content corresponding to a selected object if the displayed object is selected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipment, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
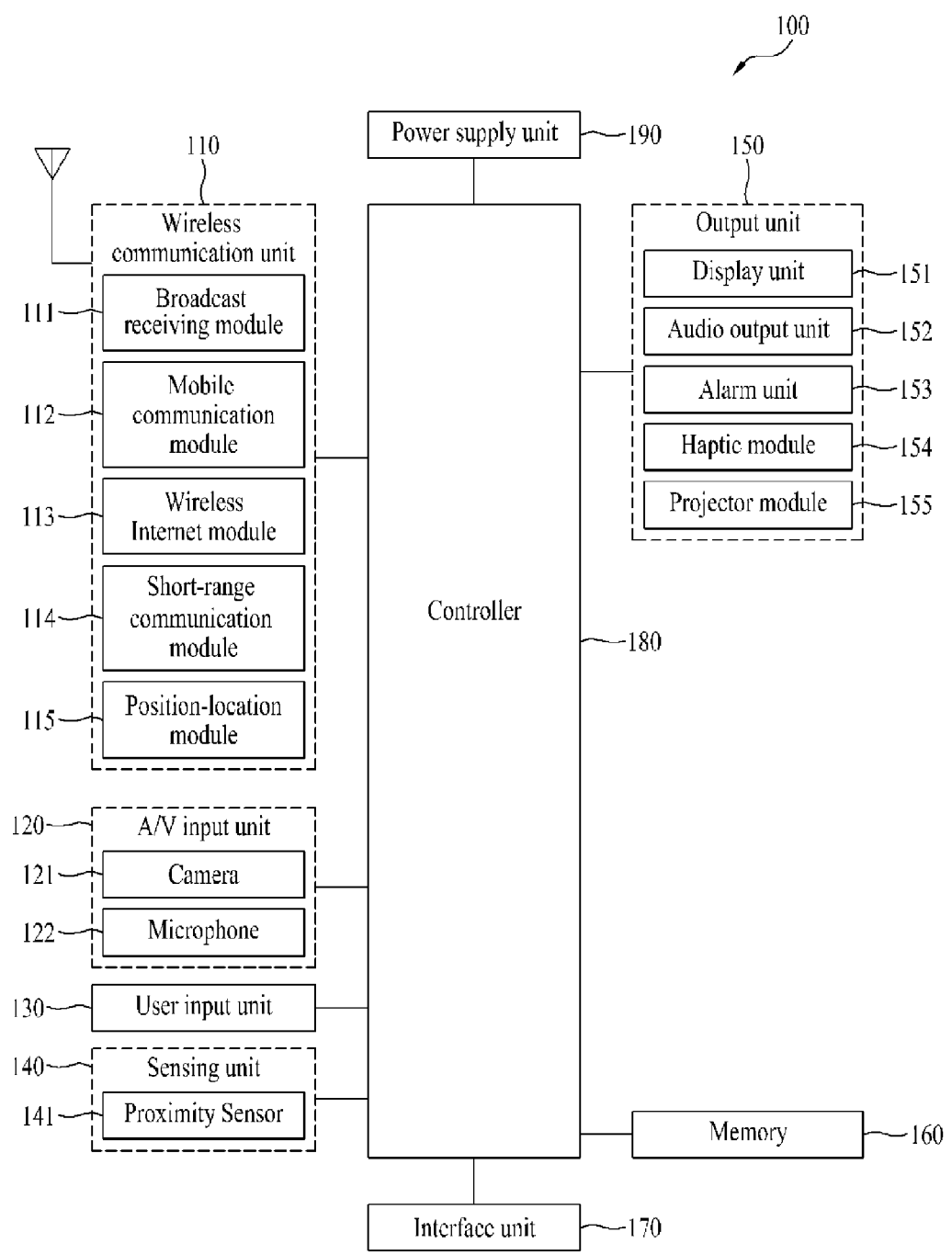
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention.

As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcast signal and/or previously-generated broadcast-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast—convergence of broadcast and mobile services (DVB-CBMS), Open Mobile Alliance broadcast (OMA-BCAST), the data broadcasting system known as media forward link only (MediaFLO) and integrated services digital broadcast-terrestrial (ISDB-T) systems. The broadcast receiving module 111 can be configured to receive signals from broadcasting systems providing broadcasting signals other than the previously described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro), World Interoperability for Microwave Access (WiMAX), or High Speed Downlink Packet Access (HSDPA). Moreover, the wireless Internet module 113 can receive or download the data relevant to the area in which the mobile terminal 100 is located from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth or ZigBee.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal. The A/V input unit 120 can include a camera 121 and a microphone 122.

For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive an external audio signal while operating in a particular mode, such as a phone call mode, a recording mode or a voice recognition mode. The microphone 122 can process the received audio signal into electrical audio data.

The audio data from the microphone unit 122 can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate receive data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply unit 190 supplies power and whether the interface unit 170 is connected to an external device.

The output unit 150 can generate visual, auditory and/or tactile outputs and can include the display unit 151, an audio output unit 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 may be able to display an operating screen of at least one content according to the present invention. In particular, when at least two content operating screens are displayed, only an operating screen of a most recently activated content or an operating screen of a content selected by a user may be displayed, while the rest of the content operating screens may be displayed as indicator icons. In doing so, if a user selects a specific indicator icon, a currently displayed content operating screen may be switched to a content operating screen corresponding to the selected indicator icon.

According to the present invention, the display unit 151 may be able to display a plurality of widgets each having specific functions assigned to them on a standby screen or a home screen.

Each of the widgets may have a configuration of an icon to which a specific function or a function of activating a specific application is assigned. For instance, each of the widgets may include one of a video file, a video player, a music file, a music player, a document file, a document editor, a game, a calculator, a phonebook, an image, an image viewer and the like.

According to the present invention, while an operation of specific content is not completed, if the operation is ended, the display unit 151 may be able to display a widget (hereinafter named a last memory widget) to which a function of resuming the content is assigned to enable the content to start with a point at which the operation was ended. The last memory widget is described in detail with reference to FIGS. 3 to 33.

The content may be data loaded in the mobile terminal 100 as 'content information in a phonebook', 'outgoing/incoming messages', 'outgoing/incoming call history', 'email', 'music file', 'video file', 'image file', 'schedule information', 'document file', 'game file', webpage address file', 'application', 'folder' and the like.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display.

The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photoelectric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern can be detected, such as a proximity touch distance, a proximity touch duration, a proximity touch position, or a proximity touch movement. For example, information corresponding to the detected proximity touch action and proximity touch pattern can be displayed on the touch screen.

The audio output unit 152 can output audio data received from the wireless communication unit 110, or stored in the memory 160, in a call receiving mode, a call placing mode, a recording mode, a voice recognition mode, or a broadcast receiving mode. The audio output unit 152 can also provide audio signals related to particular functions performed by the mobile terminal 100, such as a call received or a message received. For example, the audio output unit 152 can include a speaker, a buzzer, or other audio output device.

The alarm unit 153 can output a signal for indicating the occurrence of an event of the mobile terminal 100, such as a call received event using vibration as well as video or audio signals. The event may be a message received event and a touch input received event.

The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

Preferably, the projector module 155 is configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, the data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (XD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data or power from the external devices, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100 or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein can be implemented via a computer-readable medium using. The computer-readable medium may be computer software, hardware, or a combination thereof.

For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
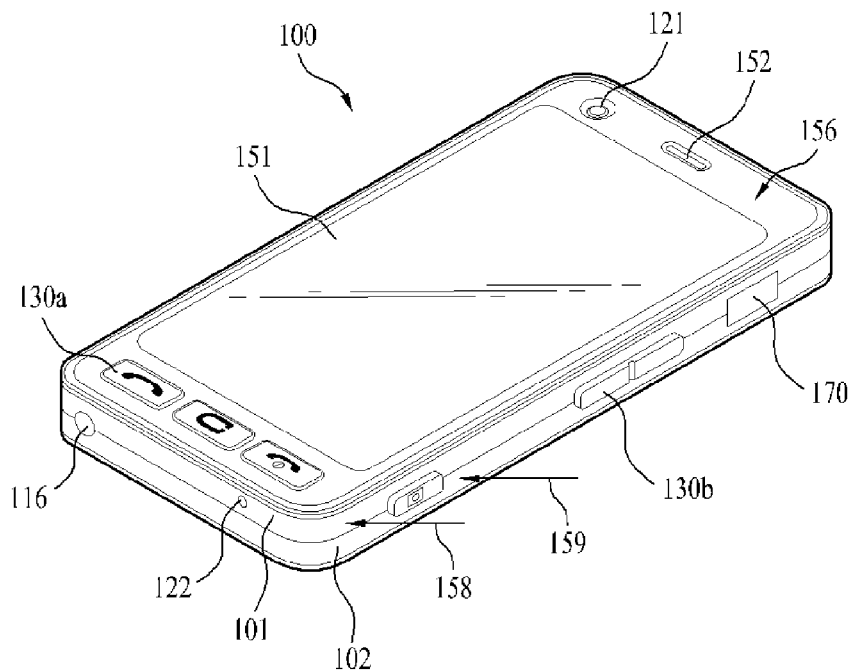
FIG. 2A is a front perspective view of a mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102.

One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
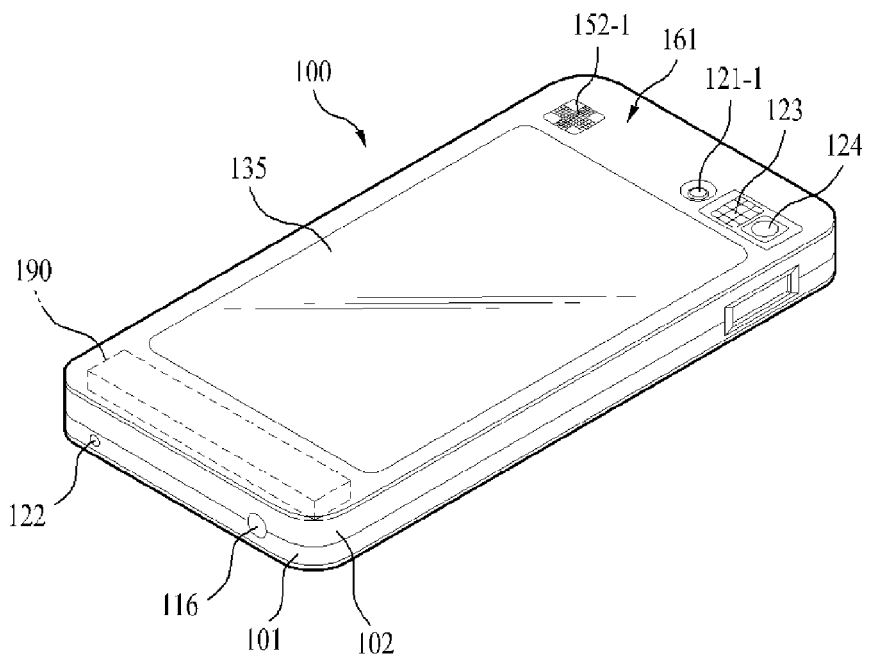
FIG. 2B is a rear perspective view of a mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output unit 152-1. The second audio output unit 152-1 can support a stereo sound function in conjunction with the audio output unit 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

A mobile terminal mentioned in this specification may include at least one of the components shown in FIG. 1. The controller 180 may be able to control an individual operation of a component or interconnected operations among a plurality of components in order to perform operations using the components (e.g., touchscreen, wireless communication unit, memory, etc.).

While a specific content is operating, but the operation of the content is not yet completed, and the operation of the content is ended by a user or an external factor, a last memory widget mentioned in this specification may mean an object to which a function of resuming the content from a point of ending the operation is assigned. In particular, while the content is operating, if a user inputs a command for ending the operation of the content, the mobile terminal 100 may end the operation of the content and may create and display the last memory widget.

If the operation of the content is forced to end due to an operating error of the mobile terminal 100 or a content error, the mobile terminal 100 may create and display the last memory widget. In doing so, an internal error of the mobile terminal 100 may include an error of an application for activating the content or an error of an operating system. The content error may include a case that a file of the content is broken or destabilized.

While an edit mode of a webpage corresponding to a sort of a content is active, if the edit mode of the webpage is ended despite not being completed, the mobile terminal 100 bookmarks the edited webpage at the ending point and may create and display a last memory widget for re-displaying the webpage. In particular, if the last memory widget is selected, the mobile terminal 100 may display the edited webpage again.

Moreover, if a preset interrupt occurs in the course of the content operation, the mobile terminal 100 ends the operation of the content and may create and display the last memory widget. The interrupt may take place in one of several follow situations.

First, since a battery of the mobile terminal 100 is in a low voltage state, the operating content may be unexpectedly ended. Second, while content is being operated via free Internet (e.g., Wi-Fi), when the mobile terminal 100 moves away into a pay Internet network (3G) area, it may be unable to operate the free content. Third, while content is operating, an event such as a call reception, a message reception, an alarm output and the like may occur in the mobile terminal 100.

The above-mentioned interrupt occur situations are just exemplary. Types of interrupt are not limited to these situations.

In the following description, a process for generating a last memory widget in a mobile terminal 100 is explained. First of all, the mobile terminal 100 checks operating status of the content at the timing point of ending the content and may save an operation status information corresponding to the checked operation status in the memory 160.

The mobile terminal 100 creates a last memory widget to which a function of resuming the content starting with the operation ended point is assigned. The mobile terminal 100 maps the created last memory widget and the saved operation status to each other. The mobile terminal 100 then displays the created last memory widget on the display unit 151.

If the displayed last memory widget is selected, the mobile terminal 100 resumes the corresponding content starting with the ended point by referring to the operation status information mapped to the last memory widget. Shape or figure of the last memory widget may be provided as a default to the memory 160, may be acquired from an external website, a related service provider or the like via the wireless communication unit 110, or may include an image designed by a user.

Moreover, the substance corresponding to the operation status information of a corresponding content may be displayed on the last memory widget. For instance, if the last memory widget is displayed as a thumbnail, it may be able to display such information as a frame image displayed at the timing point of ending an operation of the corresponding content, an operation ended time, a progressive time of the operation and the like.

A process for providing a last memory widget in the mobile terminal 100 according to the present invention is explained in detail with reference to FIGS. 3 to 33. First of all, a process for setting a configuration of a last memory widget according to the present invention is described in detail with reference to FIG. 3 and FIG. 4.

Figure 3:
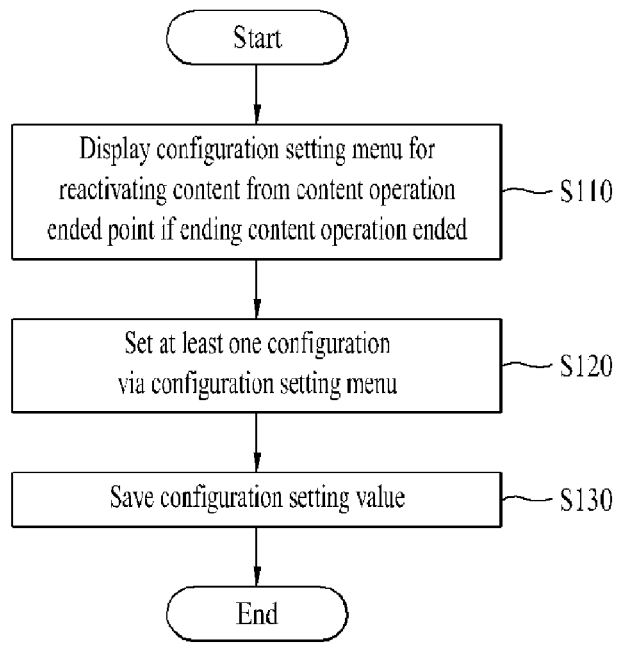
FIG. 3 is a flowchart of a process for setting a configuration of a last memory widget according to the present invention.
Figure 4:
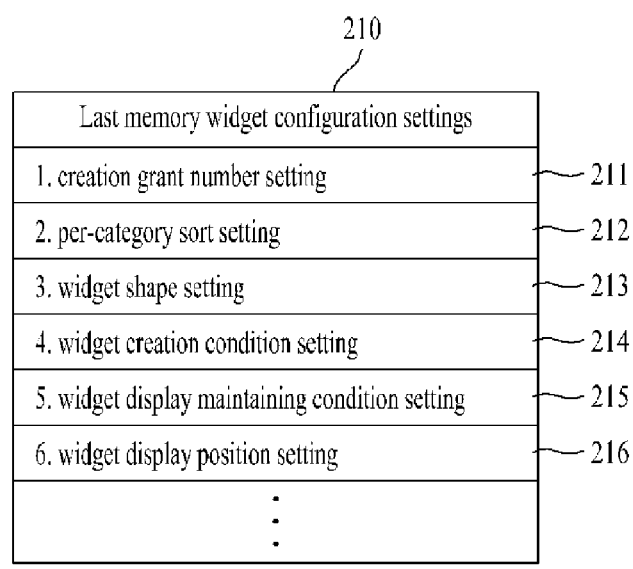
FIG. 4 is a diagram of screen configuration of a process for setting a configuration of a last memory widget according to the present invention.

FIG. 3 is a flowchart of a process for setting a configuration of a last memory widget according to the present invention. FIG. 4 is a diagram of screen configuration of a process for setting a configuration of a last memory widget according to the present invention.

Referring to FIG. 3 and FIG. 4, if a user selects a menu 210 for configuration settings of a last memory widget, the controller 180 of the mobile terminal 100 may display the configuration setting menu 210 on the display unit 151 [S110] [FIG. 4].

Referring to FIG. 4, the configuration setting menu 210 may include a plurality of submenus 211 to 216 to set at least one configuration for the last memory widget.

The user may be able to set creation and display conditions of the last memory widget through the configuration setting menu 210.

The $1^{st}$ menu 211 may provide a function of setting a creation grant number of last memory widgets. In particular, if the user selects the $1^{st}$ submenu 211 of the configuration setting menu 210, the controller 180 may display an input window for inputting the creation grant number of the last memory widgets on the display unit 151. If the creation grant number of the last memory widgets is input via the input window, the controller 180 may grant the creation of the last memory widgets up to the input number only.

For instance, if a user sets the creation grant number of the last memory widgets to 4, the controller 180 may create no more than 4 last memory widgets on the display unit 151.

The controller 180 may automatically delete the last memory widget previously created in order after 4.

If a plurality of last memory widgets are displayed on the display unit 151, the $2^{nd}$ submenu 212 may provide a function of sorting the displayed last memory widgets per category. In particular, if a user selects the $2^{nd}$ submenu 212, the controller 180 may activate the per-category sorting function and may then sort and display a plurality of the last memory widgets per category.

The category may include types of contents corresponding to the last memory widgets. For instance, when $1^{st}$ to $4^{th}$ last memory widgets are displayed on the display unit 151, if the $1^{st}$ and $2^{nd}$ last memory widgets relate to videos and the $3^{rd}$ and $4^{th}$ last memory widgets relate to webpages, the controller 180 may be able to group the $1^{st}$ to $4^{th}$ last memory widgets per category into a group of the $1^{st}$ and $2^{nd}$ last memory widgets and a group of the $3^{rd}$ and $4^{th}$ last memory widgets.

The $3^{rd}$ submenu 213 may provide a function of setting a shape of the last memory widget. In particular, if the $3^{rd}$ submenu 213 is selected, the user may be able to select a function such as a shape selection of a last memory widget, a shape change of a last memory widget, a shape addition of a last memory widget and the like.

For instance, a user may be able to set a shape of the last memory widget to a layout image saved in the mobile terminal 100 via the $3^{rd}$ submenu 213. For another instance, a user may be able to directly draw a shape of a last memory widget via the $3^{rd}$ submenu 213.

A user may set and display a start screen of a corresponding content, a desired screen, a screen image of a content ended position and the like via the $3^{rd}$ submenu 213. A user may be able to set a display style of the last memory widget via the $3^{rd}$ submenu 213. The display style may include all items capable of editing a display style of the last memory widget such items may be as a size, a color, a font, a transparency, 3D, a rotation and the like.

If an operation of content corresponding to the last memory widget is a download operation, the user may be able to set information indicating a progressive status of a download of the content to be displayed within the last memory widget via the $3^{rd}$ submenu 213. The information indicating the progressive status of the download of the content may be displayed as a progressive bar within the last memory widget.

A user may be able to set information corresponding to an operation status of a corresponding content to be displayed within the last memory widget via the $3^{rd}$ submenu 213. A user may be able to set a memo in the last memory widget via the $3^{rd}$ submenu 213.

In particular, the user may input memo content via the $3^{rd}$ submenu 213 and may then attach the input memo content to the last memory widget. The memo content may be displayed within the last memory widget or may be displayed on the last memory widget.

The $4^{th}$ submenu 214 may provide a function of setting a creation condition of a last memory widget. In particular, if the $4^{th}$ submenu 214 is selected, items of the interrupts mentioned in the foregoing description may be displayed.

If a user selects a prescribed interrupt select, the selected interrupt may be set as a creation condition of a last memory widget. Namely, while specific content is operating, if the set interrupt occurs, an operation of the content is ended and a last memory widget corresponding to the ended operation content may be created.

The $5^{th}$ submenu 215 may provide a function of setting a display maintained duration of a last memory widget. The last memory widget of the present invention may include an instant widget or a stationary widget continuously displayed on a screen.

If a user sets a display maintained duration of the last memory widget via the $5^{th}$ submenu 215, the controller 180 controls the last memory widget to be displayed for the set display maintained duration only after the creation and display of the last memory widget. For instance, if the display maintained duration is set to 5 hours, the controller 180 may keep the display of the last memory widget for '5 hours' in a status that the last memory widget was initially displayed. After elapse of the '5 hours', the controller 180 may delete the last memory widget or may display a popup window for inquiring of a user whether to switch the last memory widget to the stationary widget.

The $6^{th}$ submenu 216 may provide a function of setting a display position of a last memory widget. In particular, a user may be able to set a display position of a last memory widget on a screen via the $6^{th}$ submenu 216. For instance, the user may be able to set a display position of a last memory widget to a desired position such as a top part, a bottom part, a left part, a right part and the like of the display unit 151 via the $6^{th}$ submenu 216.

A user may be able to set a type of a screen, on which a last memory widget will be displayed, via the $6^{th}$ submenu 216. The type of the screen may include one of a power ON screen, a power OFF screen, a standby screen, a home screen, a content activated screen, an all screen and the like.

For instance, if a user sets the home screen via the $6^{th}$ submenu 216, the controller 180 may display a last memory widget within the home screen only. If a user sets the all screen via the 6$^{th}$ submenu 216, the controller 180 may keep displaying a last memory widget despite a screen of the display unit 151 being changed.

As mentioned in the previous description, at least one display configuration condition of the last memory widget may be set via the configuration setting menu 210 [S120]. The controller 180 may save the setting result in the memory 160 [S130].

The process for setting the configuration of the last memory widget according to the present invention is described in detail with reference to FIG. 3 and FIG. 4. The configuration setting menu of the last memory widget is not limited to the disclosure related to FIG. 4. In particular, all items capable of setting the display configurations of the last memory widget may be included in the configuration setting menu 210.

As mentioned in the foregoing description with reference to FIG. 3 and FIG. 4, the last memory widget configuration setting process may be set in advance by a user prior to an activation of a specific content. Alternatively, the last memory widget configuration setting process may be executed prior to creation of the last memory widget after activation of a specific content.

In this case, if an operation of the content is ended, the controller 180 may display the configuration setting menu 210, as shown in FIG. 4. If at least one display configuration condition is set via the configuration setting menu 210, the controller 180 may create and display a last memory widget that reflects the set display configuration condition.

Figure 5:
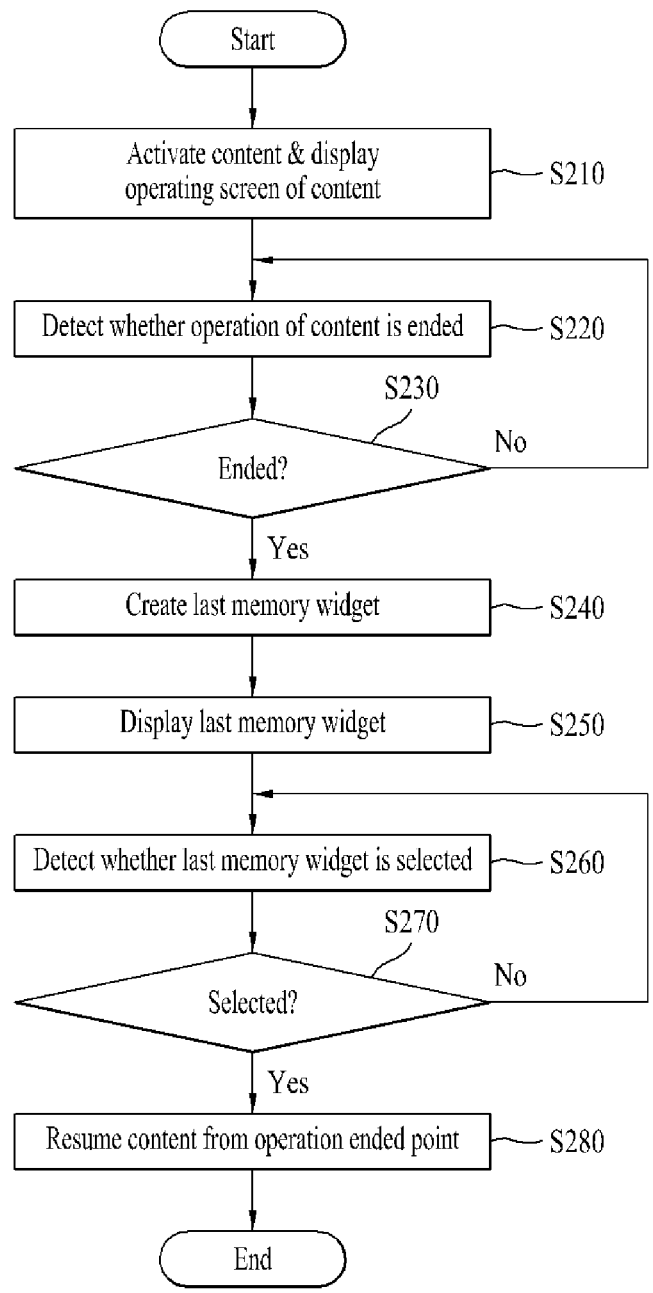
FIG. 5 is a flowchart of a process for resuming operation of content using a last memory widget according to the present invention.

In the following description, an operating process interconnected to a last memory widget of the present invention is described in detail with reference to FIGS. 5 to 19. FIG. 5 is a flowchart of a process for resuming content using a last memory widget according to the present invention. FIGS. 6 to 19 are diagrams for properties of a last memory widget according to the present invention.

Referring to FIG. 5, if at least one content is selected via the user input unit 130 or the touchscreen 151, the controller 180 of the mobile terminal 100 may activate the selected content and may control an image of an operating screen of the activated content to be displayed on the touchscreen 151 [S210]. Thereafter, the controller 180 may monitor whether the operation of the content in progress is ended [S220].

In particular, the controller 180 may monitor whether a user inputs a command for ending the operation of the content via the user input unit 130 or the touchscreen 151. The controller 180 may also monitor if the content is ended due to an event.

The controller 180 may monitor whether the content is forced to end due to an occurrence of an operation error (e.g., malfunction, etc.) of the mobile terminal 100 in the course of operating the content. The controller 180 may monitor whether the content is forced to be ended due to an occurrence of an operation error of an application for driving the content or an occurrence of an operation error of an operating system (OS) in the course of operating the content. The controller 180 may monitor whether the content is forced to be ended due to an occurrence of an operation error of the content in the course of operating the content. Moreover, the controller 180 may monitor whether an interrupt corresponding to the last memory widget creation condition, which is set in FIG. 3 and FIG. 4, occurs in the course of operating the content.

If the controller 180 determines that the operation of the content is ended with reference to the above-mentioned factors [S230], the controller 180 may crate a last memory widget to resume the content from an ended point of the content [S240]. The controller 180 obtains information corresponding to an operation status of the content at the timing point of ending the operation, maps the obtained operation status information of the content to the created last memory widget, and then saves them in the memory 160.

For instance, if the content is a video, the operation status information may include a video file name, a video image displayed at an operation ended point, a caption image displayed at the operation ended point, play time information on an operation ended play time versus a total video play time, a creation time of a last memory widget and the like.

For another instance, if the content is a message, the operation status information may include message recipient information, message content, message reception/transmission time, message writing time, an image corresponding to the message, a creation time of a last memory widget and the like.

For another instance, if the content is a webpage, the operation status information may include a webpage address, a webpage name, a webpage use time, a creation time of a last memory widget and the like.

For another instance, if an operation of the content is a download operation, the operation status information may include a name of a currently downloaded content, a download start time, a download progressive time, a creation time of a last memory widget and the like.

If a display configuration setting value of the last memory widget to be created is saved in the memory, as mentioned in the foregoing description with reference to FIG. 3 and FIG. 4, the controller 180 may search the memory 160 for the display configuration setting value and may then create the last memory widget based on the found display configuration setting value.

If the display configuration setting value of the last memory widget to be created is not saved in the memory 160, the controller 180 may display the display configuration setting menu 210 described with reference to FIG. 3 and FIG. 4. If a display configuration value of the last memory widget to be created is set through the display configuration setting menu 210, the controller 180 may create the last memory widget based on the set display configuration value.

Subsequently, the controller 180 may display the created last memory widget on the touchscreen 151 [S250]. In doing so, the controller 180 may control the created last memory widget to be displayed within a preset operation mode screen of the mobile terminal 100 such as a standby screen, a home screen containing a plurality of application icons, a user-desired screen, a power ON screen, a power OFF screen and the like.

Moreover, even if the operation mode screen or information displayed in a specific operation mode is changed, the controller 180 is able to keep displaying the created last memory widget. Meanwhile, the controller 180 may monitor whether the last memory widget displayed on the screen of touchscreen 151 is selected [S260].

If the last memory widget is selected [5270], the controller 180 searches the memory 160 for the operation status information of the content mapped to the selected last memory widget and may resume the found content from the operation ended point based on the found operation status information [S280]. If the found content is resumed, the controller 180 is able to delete the last memory widget corresponding to the content from the screen.

Figure 6:
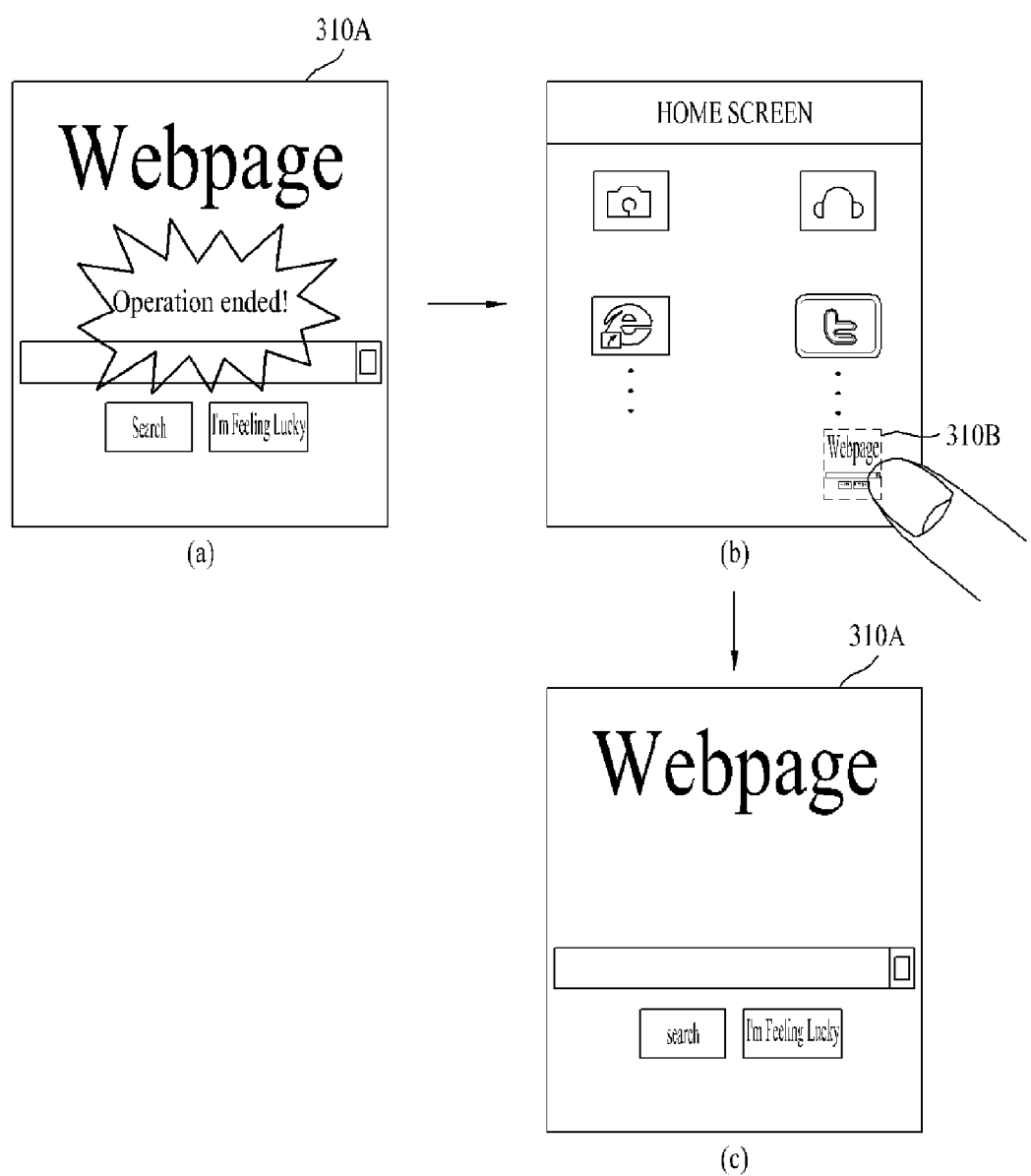
FIGS. 6 to 19 are diagrams illustrations properties of a last memory widget according to the present invention.

Referring to FIG. 6 (a), after a webpage 310A provided by a specific website has been accessed, while the webpage 310A is displayed, a display operation of the webpage 310A is ended. If the controller 180 determines that the display operation of the webpage 310A is ended, referring to FIG. 6

(b), the controller 180 may create and display a $1^{st}$ last memory widget 310B corresponding to the webpage 310A.

Although FIG. 6 (b) shows that the screen having the $1^{st}$ last memory widget 310B displayed thereon is a home screen, the $1^{st}$ last memory widget 310B may be displayed on another screen as well as the home screen. Optionally, even if the screen is switched, the display of $1^{st}$ last memory widget 310B may be maintained for a determined duration.

A size of the $1^{st}$ last memory widget 310B may be adjustable on the screen. The $1^{st}$ last memory widget 310B may be shiftable or position-fixable in accordance with a drag & touch action of a user. If the displayed $1^{st}$ last memory widget 310B is selected [FIG. 6 (b)], the controller 180 may re-display the webpage 310A from the operation ended point [FIG. 6 (c)].

Figure 7:
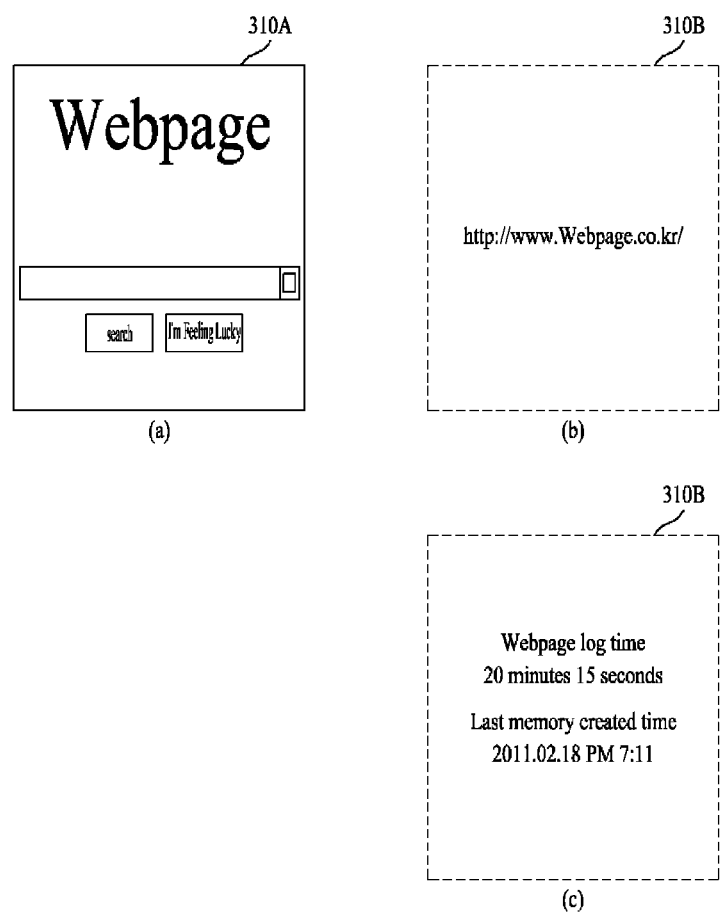

FIG. 7 is a diagram of the last memory widget created by the process shown in FIG. 5. Referring to FIGS. 7 (a) to (c), the controller 180 may display the $1^{st}$ last memory widget 310B as a thumbnail and may display operation status information of the corresponding content 310A within the thumbnail of the $1^{st}$ last memory widget 310B.

In particular, referring to FIG. 7 (a), the controller 180 may control a screen image, which was displayed at the operation end point of the corresponding content 310A, to be displayed within the thumbnail of the $1^{st}$ last memory widget 310B. Referring to FIG. 7 (b), the controller 180 may control information indicating a name of the corresponding content 310A to be displayed within the thumbnail of the $1^{st}$ last memory widget 310B. In particular, since the content corresponding to the $1^{st}$ last memory widget 310B is the webpage 310A, the controller 180 may control the name of the webpage 310A to be displayed within the thumbnail of the $1^{st}$ last memory widget 310B.

Referring to FIG. 7 (c), the controller 180 may control information that indicates a use time of the webpage 310A and a creation time of the $1^{st}$ last memory widget 310B to be displayed within the thumbnail of the $1^{st}$ last memory widget 310B. The controller 180 may also create and display the $1^{st}$ last memory widget 310B, which reflects the display configuration setting values set in the process described with reference to FIG. 3 and FIG. 4.

Figure 8:
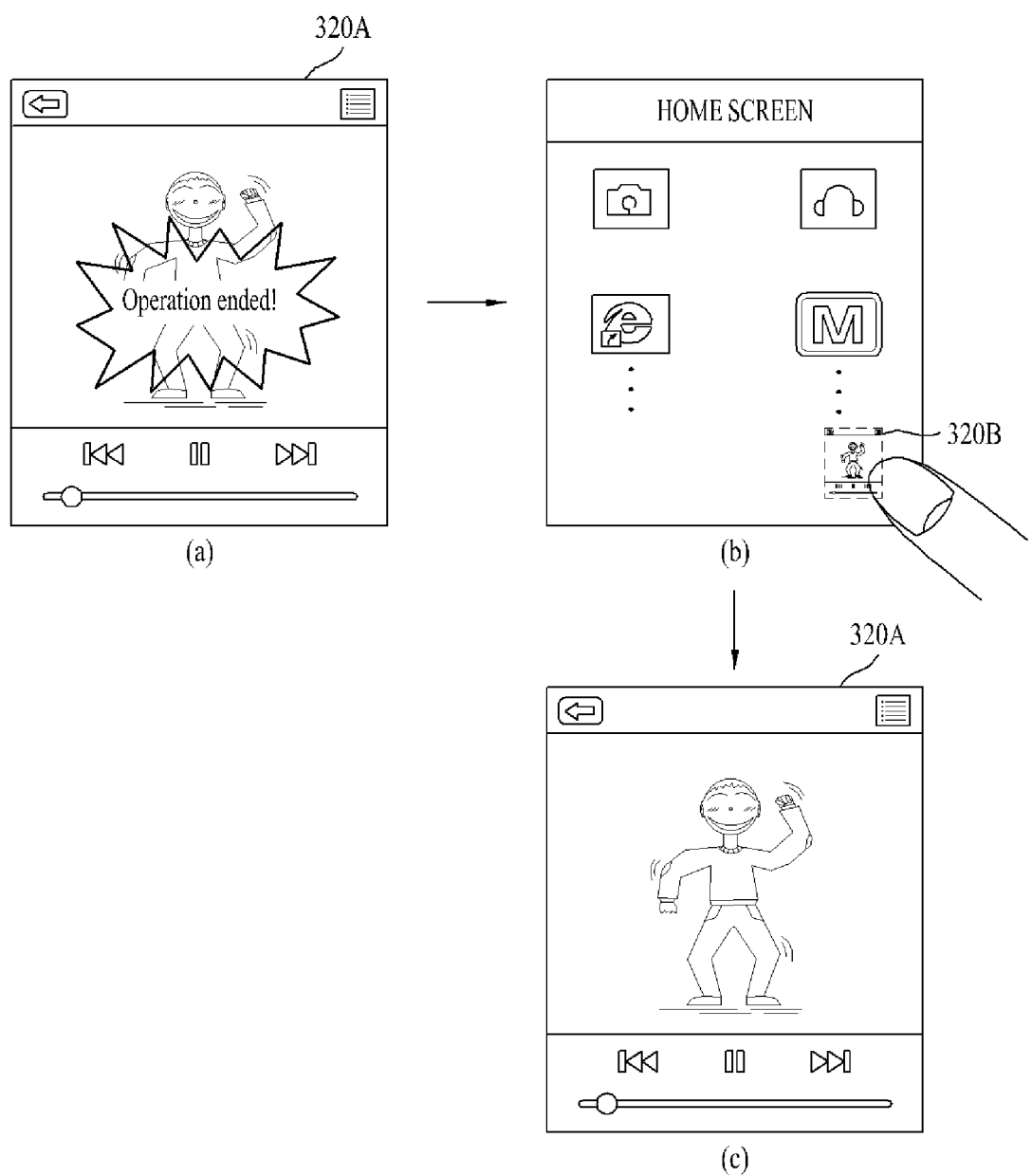

Referring to FIGS. 8 (a) and (b), a $2^{nd}$ last memory widget 320B, corresponding to a video 320A, that is created and displayed. If the displayed $2^{nd}$ last memory widget 320B is selected, the video 320A may be resumed from an operation ended point of the video 320A [FIG. 8 (c)].

Figure 9:
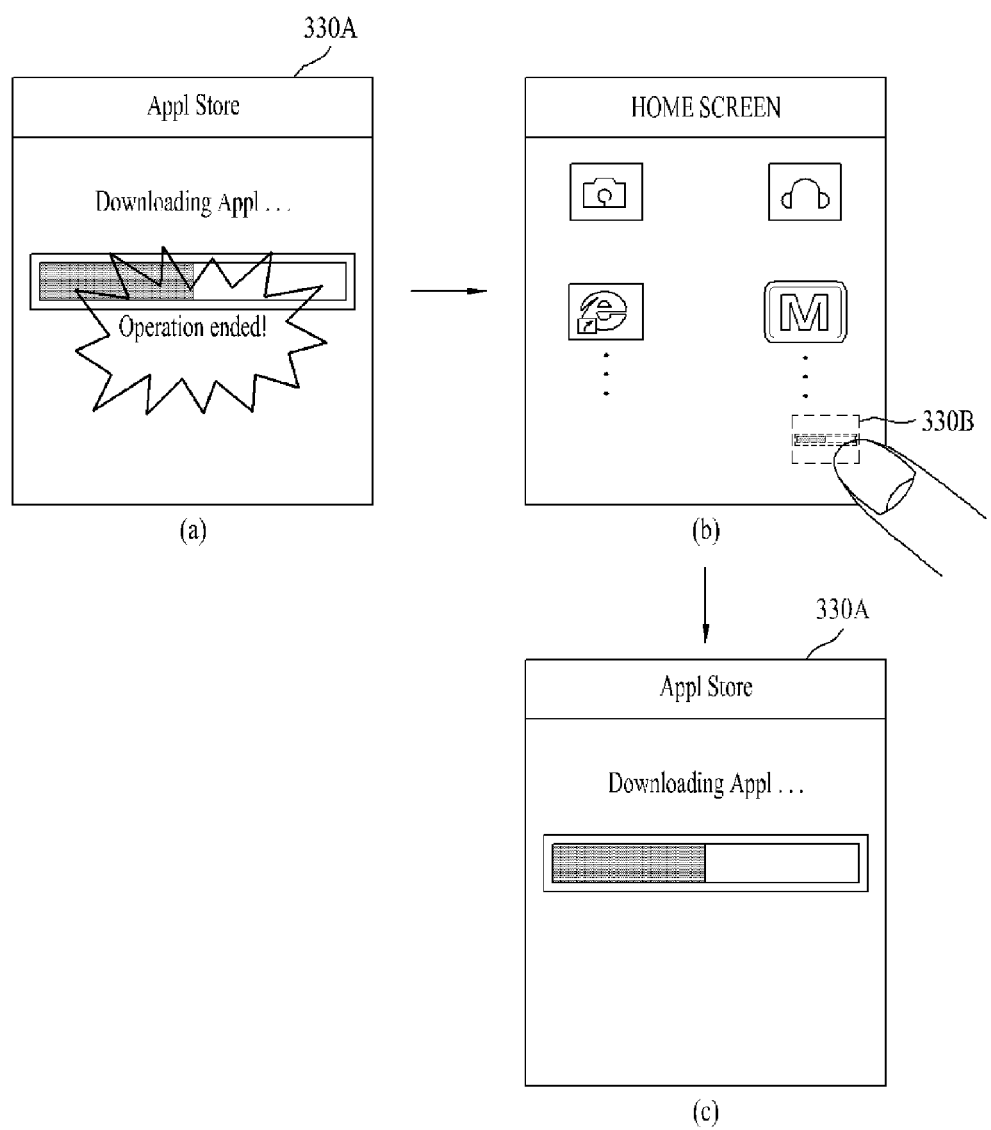

Referring to FIG. 9 (a), a download operation of an application 330A is ended in the course of downloading the application 330A. If the controller 180 determines that the download operation of the application 330A is ended, referring to FIG. 9 (b), the controller 180 may create and display a $3^{rd}$ last memory widget 330B corresponding to the download operation of the application 330A. If the displayed $3^{rd}$ last memory widget 330B is selected, referring to FIG. 9 (c), the controller 180 may resume the download operation of the application 330A from the operation ended point.

While the $3^{rd}$ last memory widget 330B corresponding to the download operation of the application 330A is displayed, if a downloadable configuration (e.g., WiFi network connection) of the application 330A is established, the controller 180 may cause the $3^{rd}$ last memory widget 330B to be selected by emphasizing the displayed $3^{rd}$ last memory widget 330B. For instance, the controller 180 may control the $3^{rd}$ last memory widget 330B to be displayed by blinking or shaking.

The controller 180 may control identification information, which enables a user to identify a remaining download size of the application 330A, to be displayed within the $3^{rd}$ last memory widget 330B. In particular, referring to FIG. 9 (c), the controller 180 may display a progressive bar, which indicates a progressive status of the download, as the identification information.

The controller 180 may control the download progressive status to be displayed by adjusting transparency of the $3^{rd}$ last memory widget 330B [not shown in the drawing]. For instance, if a level of the download progression status of the $3^{rd}$ last memory widget 330B increases, the transparency of the $3^{rd}$ last memory widget 330B may become thick. If a level of the download progression status of the $3^{rd}$ last memory widget 330B decreases, the transparency of the $3^{rd}$ last memory widget 330B may become thin. If the download of the application 330A is not available from the operation ended point, the controller 180 may re-download the application 330A from the beginning.

Figure 10:
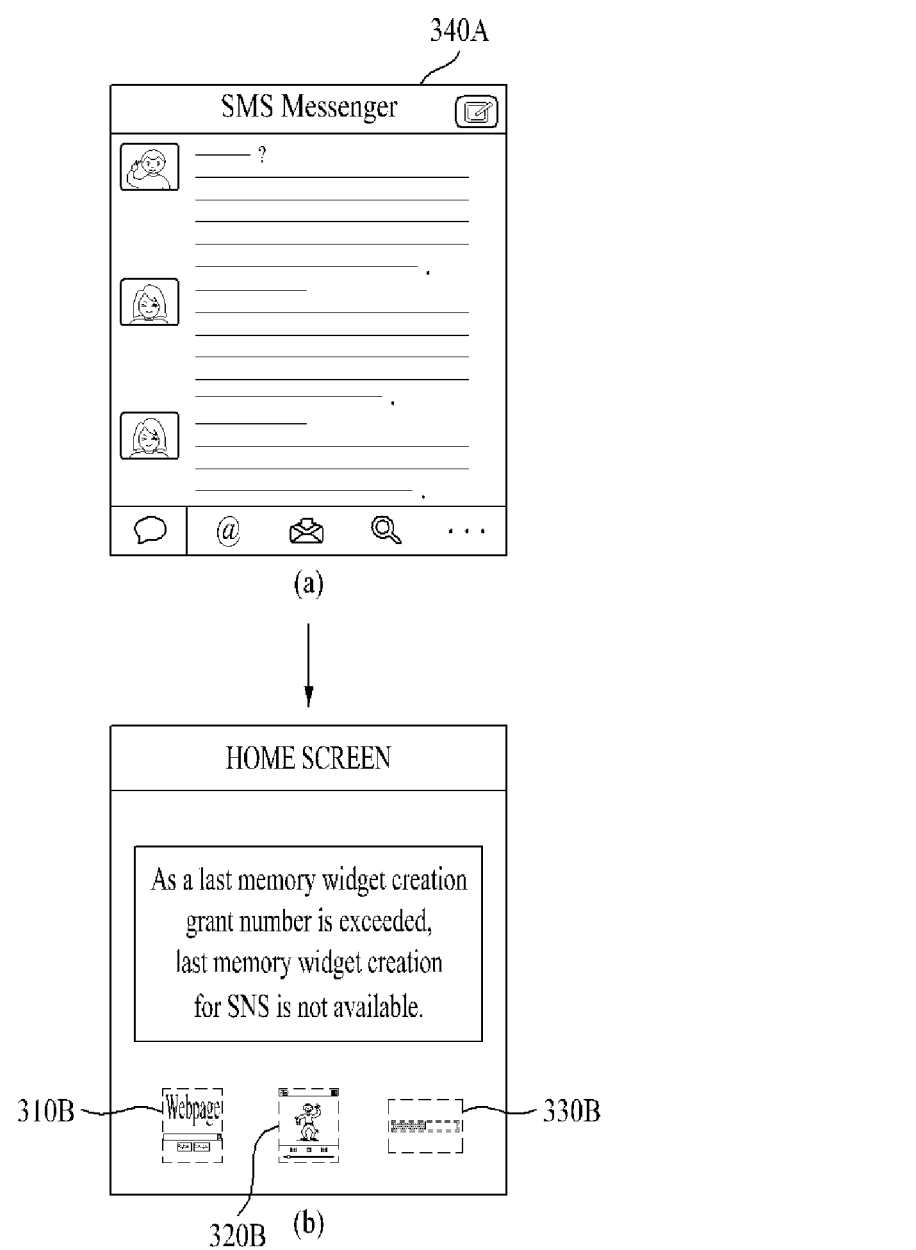
Figure 11:
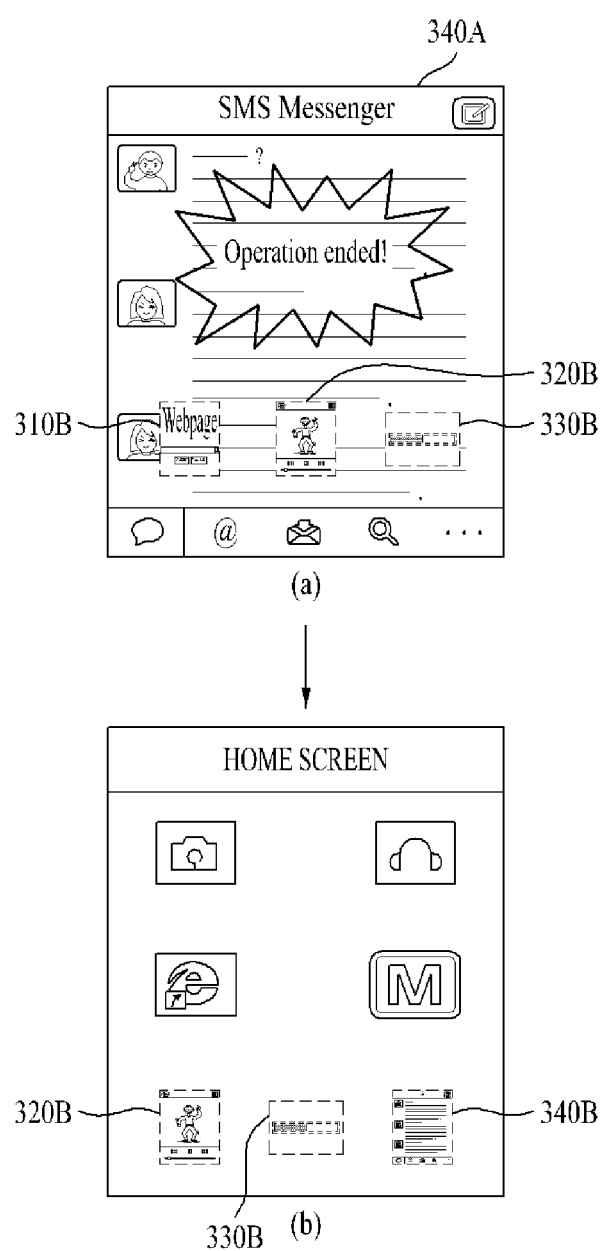

FIG. 10 and FIG. 11 show a process for determining whether to create a last memory widget corresponding to content, of which operation is currently ended, in accordance with a preset creation grant number of last memory widgets. Referring to FIG. 10 and FIG. 11 (a), while Social Networking Service (SNS) Messenger 340A is operating, if an operation of SNS Messenger 340A is ended, the controller 180 may monitor whether a creation grant number of last memory widgets is set in the memory 160, as shown in FIG. 3 and FIG. 4.

If the creation grant number of the last memory widgets is set in the memory 160, if the number of last memory widgets 310B, 320B and 330B displayed within a current screen including a $4^{th}$ last memory widget corresponding to SNS Messenger 340B exceeds the creation grant number set in the memory 160, referring to FIG. 10 (b), the $4^{th}$ last memory widget corresponding to SNS Messenger 340A may not be created. For instance, when the creation grant number of the last memory widgets is set in the memory 160, if the number of the last memory widgets displayed within the current screen including the $4^{th}$ last memory widget is '4', the $4^{th}$ last memory widget may not be created.

Referring to FIG. 11 (b), if the creation grant number of the last memory widgets is set in the memory 160, if the number of last memory widgets 310B, 320B and 330B displayed within a current screen exceeds the creation grant number set in the memory 160, the controller 180 may delete the last memory widget 310B having an earliest creation date among those of the last memory widgets 310B, 320B and 330B currently displayed on the screen. The controller 180 may then display the $4^{th}$ last memory widget 340B corresponding to SNS Messenger 340B

Figure 12:
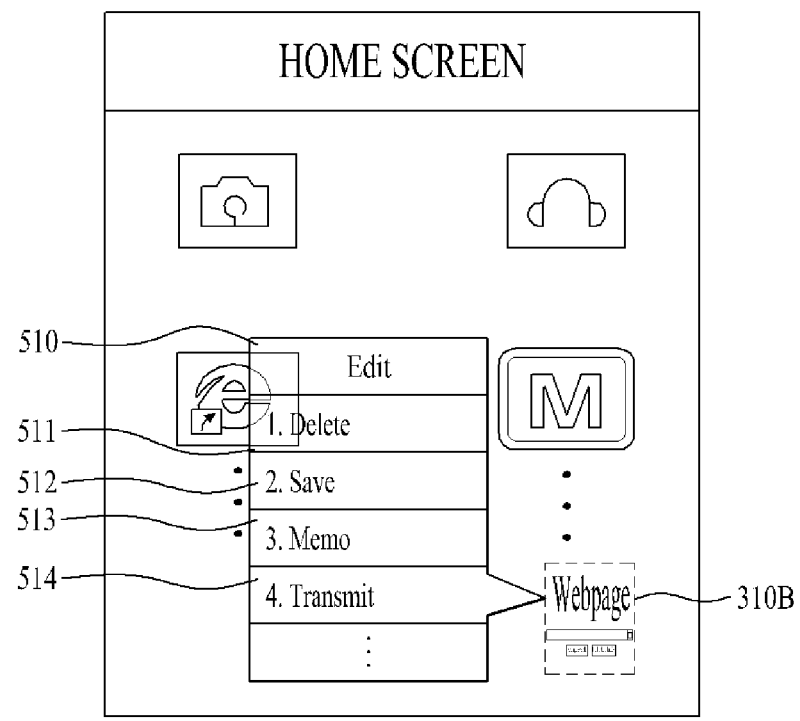

FIG. 12 shows a menu of providing a function of editing a last memory widget displayed on a current screen. Referring to FIG. 12, if a user inputs a command for editing the $1^{st}$ last memory widget 310B, the controller 180 may display an editing menu 510 that provides a function of editing the $1^{st}$ last memory widget 310B by at least one method.

A command for paging the editing menu 510 to the screen can include one several actions. First, a user may perform touches, up to a count equal to or greater than the preset number of times to the $1^{st}$ last memory widget 310B. Second, while a user touches the $1^{st}$ last memory widget 310B, the touch may be maintained for a preset duration, the touch called a long touch. Third, a user may input a touch gesture having a specific pattern to the $1^{st}$ last memory widget 310B, such as a touch gesture having a shape of an initial 'E' of 'Edit'.

Meanwhile, referring to FIG. 12, the editing menu 510 may include $1^{st}$ to $4^{th}$ submenus 511 to 514. In particular, if the $1^{st}$ submenu 511 is selected, the controller 180 may delete the $1^{st}$ last memory widget 310B from the screen. If the 2$^{nd}$ submenu 512 is selected, the controller 180 may control the 1$^{st}$ last memory widget 310B and information related to the 1$^{st}$ last memory widget 310B to be saved in the memory 160. The controller 180 may create a last memory widget storage folder within the memory 160 and may then save the 1$^{st}$ last memory widget 310B and the information related to the 1$^{st}$ last memory widget 310B in the created last memory widget storage folder. Therefore, the controller 180 may enable a user to find and use the saved 1$^{st}$ last memory widget 310B quickly.

If the 3$^{rd}$ submenu 513 is selected, the controller 180 may display a memo input window for inputting memo content to the 1$^{st}$ last memory widget 310B. If a user inputs the memo content via the memo input window, the controller 180 may attach the input memo content to the 1$^{st}$ last memory widget 310B.

The memo content may be displayed within the 1$^{st}$ last memory widget 310B. Alternatively, the memo content may be externally displayed as a word balloon outside the 1$^{st}$ last memory widget 310B. In particular, a user may write a memo of additional description of the 1$^{st}$ last memory widget 310B, a memo of a history of ending a corresponding content, a memo of a usage and the like. The user may be then be able to resume the content corresponding to the 1$^{st}$ last memory widget 310B by referring to the input memos in the future.

If the 4$^{th}$ submenu 514 is selected, the controller 180 may display a contact input window for transmitting the 1$^{st}$ last memory widget 310B and the information related to the 1$^{st}$ last memory widget 310B. If a contact of a counterpart is input via the contact input window, the controller 180 may transmit the 1$^{st}$ last memory widget 310B and the information related to the 1$^{st}$ last memory widget 310B to the counterpart contact via the wireless communication unit 110.

The controller 180 may transmit the content corresponding to the 1$^{st}$ last memory widget 310B to the counterpart. If a user is unable to resume the content corresponding to the 1$^{st}$ last memory widget 310B using a current user's mobile terminal 100, the 1$^{st}$ last memory widget 310B is transmitted to a counterpart terminal provided with the content and the content corresponding to the 1$^{st}$ last memory widget 310B may be resumed through the counterpart terminal.

The editing menu 510 of the present invention may include any function of editing the 1$^{st}$ last memory widget 310B as well as the 1$^{st}$ to 4$^{th}$ submenus 511 to 514. For instance, a menu of changing a display style of the 1$^{st}$ last memory widget 310B may be included in the editing menu 510 and a menu of setting an alarm of the 1$^{st}$ last memory widget 310B may be included in the editing menu 510 as well.

Figure 13:
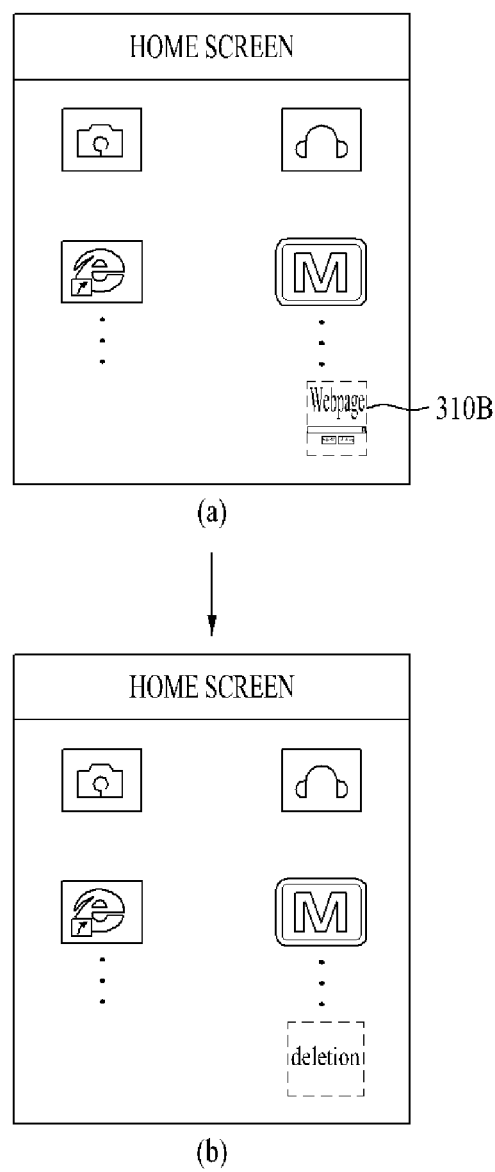

FIG. 13 shows a process for deleting a last memory widget currently displayed on a screen. Referring to FIG. 13 (a), after the controller 180 has created a 1$^{st}$ last memory widget 310B, while the 1$^{st}$ last memory widget 310B is displayed, the controller 180 may monitor whether the 1$^{st}$ last memory widget 310B is selected by a user for a preset duration.

The duration for monitoring a selection of the 1$^{st}$ last memory widget 310B may be settable and changeable by a user. In particular, the controller 180 may provide a setting window for setting the duration and a user may be able to set and/or change the duration via the setting window.

As a result of the monitoring, if the 1$^{st}$ last memory widget 310B is not selected for the preset duration, the controller 180 may regard the 1$^{st}$ last memory widget 310B as not used and may then delete the 1$^{st}$ last memory widget 310B. For instance, when the duration is set to 5 hours, if the 1$^{st}$ last memory widget 310B is not selected for 5 hours after the creation of the 1$^{st}$ last memory widget 310B, the controller 180 may delete the 1$^{st}$ last memory widget 310B.

Figure 14:
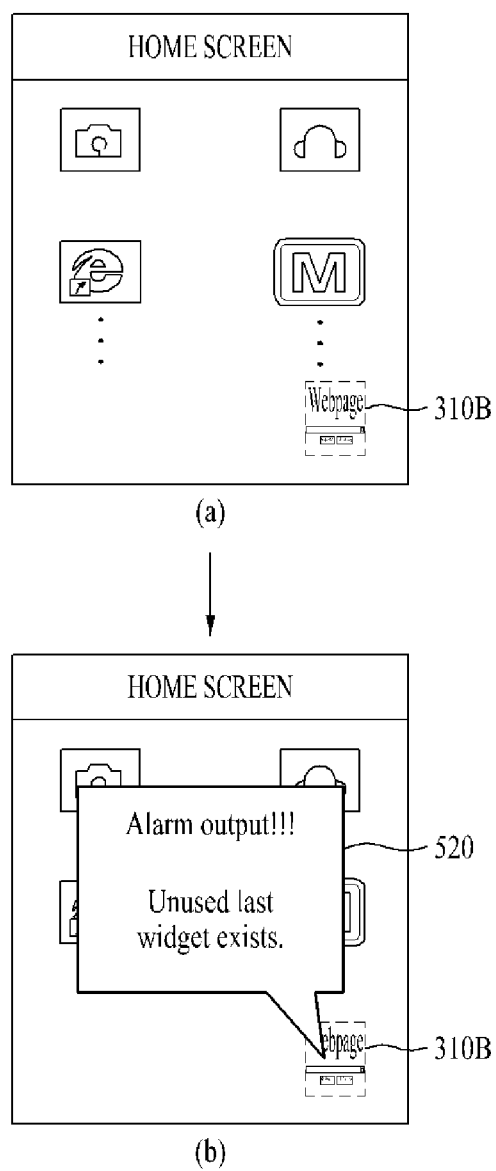

FIG. 14 shows a process for outputting an alarm of a last memory widget currently displayed on a screen. Referring to FIG. 14 (a), after a 1$^{st}$ last memory widget 310B has been created, while the created 1$^{st}$ last memory widget 310B is displayed, the controller 180 may monitor whether an alarm 520 for informing a user of a presence of the 1$^{st}$ last memory widget 310B is set in the 1$^{st}$ last memory widget 310B.

The alarm 520 may be set in advance via the former configuration setting menu 210 described with reference to FIG. 4. The alarm 520 may be set in advance via the editing menu 510 shown in FIG. 12. The alarm 520 may be set as default in the mobile terminal 100 in advance.

If the alarm 520 is set in the 1$^{st}$ last memory widget 310B, referring to FIG. 14 (b), the controller 180 may output the alarm 520 at an output time of the alarm 520. In this case, the alarm 520 may include an audio indicating the alarm 520 or alarm information indicating the alarm 520.

While the alarm 520 is set in the 1$^{st}$ last memory widget 310B, if the 1$^{st}$ last memory widget 310B is not selected for a preset duration, as shown in FIG. 13, the controller 180 may be able to output the alarm 520.

The alarm 520 may be output in accordance with a presence or non-presence of a selection of the 1$^{st}$ last memory widget 310B for the preset duration instead of being output at the output time of the alarm 520.

Figure 15:
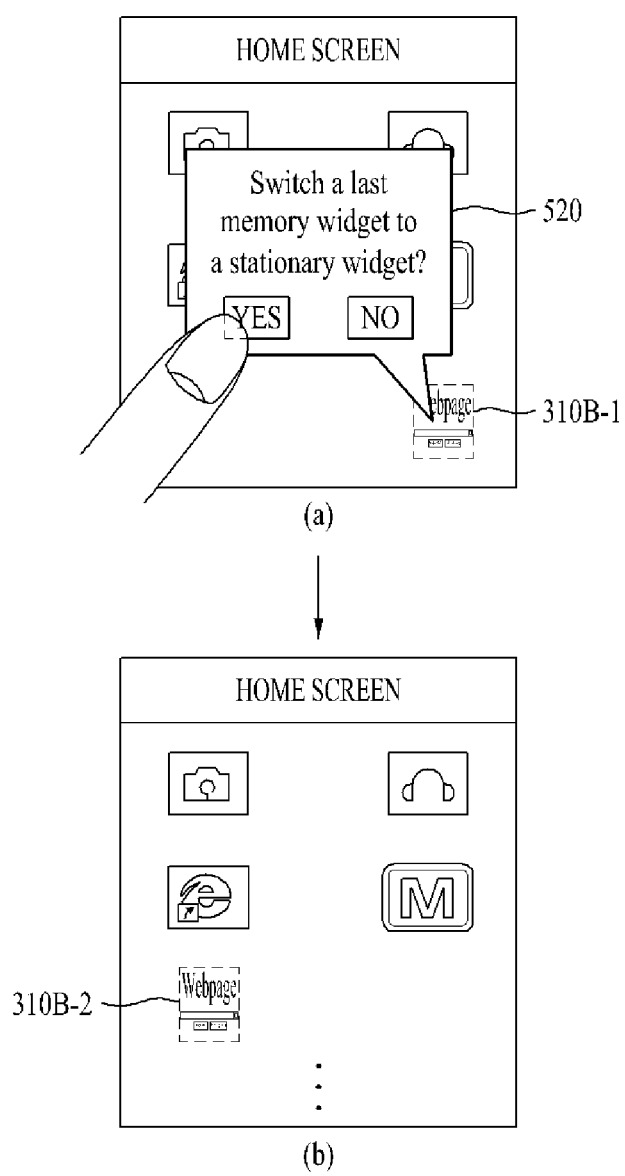

FIG. 15 shows a process for displaying a stationary last memory widget by switching an instant last memory widget currently displayed on a screen to the stationary last memory widget. In particular, as mentioned in the foregoing description with reference to FIG. 13, a last memory widget of the present invention may include an instant widget, which may be deleted based on whether it used or not, and may be switched to a stationary widget that is not deleted in accordance with a user setting.

Referring to FIG. 15, while the instant 1$^{st}$ last memory widget 310B-1 is displayed, if a command 520 for switching the 1$^{st}$ last memory widget 310B-1 to a stationary widget 310B-2 is input [FIG. 15 (a)]. The controller 180 may switch the instant 1$^{st}$ last memory widget 310B-1 to the stationary widget 310B-2 and may then display the stationary widget 310B-2 [FIG. 15 (b)].

Referring to FIG. 15 (b), the controller 180 may display the stationary widget 310B-2 in a manner of shifting it into a home screen containing a plurality of applications. In particular, the stationary widget 310B-2 may be the widget that is not deleted unless deleted by a user like the applications contained in the home screen, and may be displayed within the home screen together with the applications.

The controller 180 may provide a function of setting a password for the stationary widget 310B-2 for a user's privacy protection. In particular, if content corresponding to the stationary widget 310B-2 includes a personal mail, others may read the personal mail using the stationary widget.

Therefore, a user may protect his privacy by setting a password for the stationary widget 310B-2. Optionally, a password setting may be available for the last memory widget 310B-1 prior to the switching.

Figure 16:
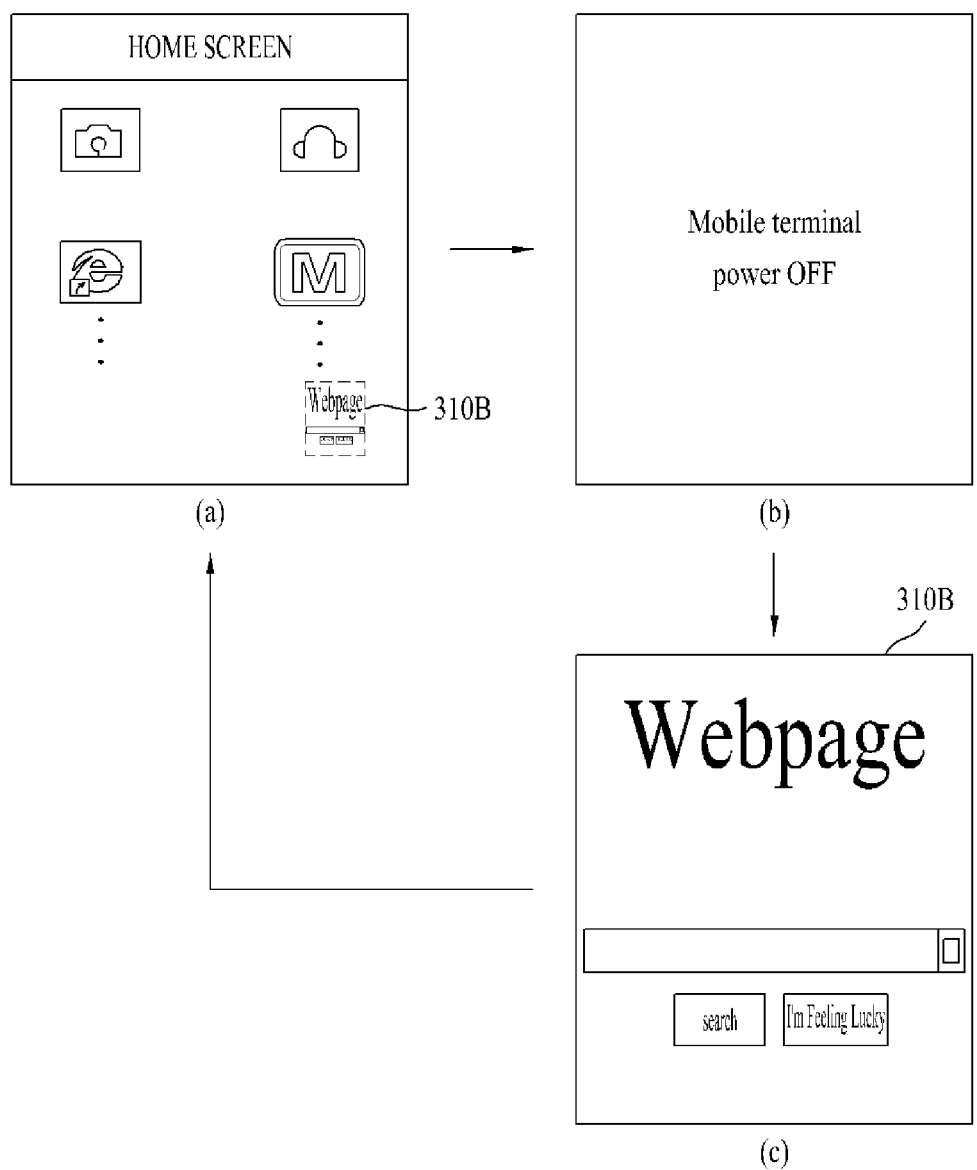

FIG. 16 shows a process for informing a user of a presence of a last memory widget by emphasizing the last memory widget on a specific operation mode screen of the mobile terminal 100. In particular, after a current last memory widget has been created, if an operation mode of the mobile terminal 100 is a preset operation mode or is switched to a preset operation mode, the controller 180 may inform a user of a presence of the current last memory widget by emphasizing and displaying the currently created last memory widget within the specific operation mode screen.

The specific operation mode may be previously set as a default in the memory 160 or may be set by a user in advance. The specific operation mode may include one of a standby screen, a home screen, a power ON screen, a power OFF screen, a content activated screen and the like.

In the following description with reference to FIG. 16, assume that the preset specific operation mode screen is a power ON screen. Referring to FIG. 16, after a $1^{st}$ last memory widget 310B has been created [FIG. 16 (a)], a power of the mobile terminal 100 is turned off [FIG. 16 (b)].

If the power of the mobile 100 is turned on, the controller 180 may display the $1^{st}$ last memory widget 310B by full-up (i.e., display all) while the power-on screen is displayed [FIG. 16 (c)]. Thus, the controller 180 may inform a user that the $1^{st}$ last memory widget 310B exists while the power-on screen is maintained.

Optionally, while the power-on screen is displayed, the controller 180 may emphasize a display color or an outline of the $1^{st}$ last memory widget 310B to inform a user of the presence of the $1^{st}$ last memory widget 310B. Optionally, while the power-on screen is displayed, the controller 180 may display the $1^{st}$ last memory widget 310B by blinking or may output audio indicating the presence of the $1^{st}$ last memory widget 310B.

Figure 17:
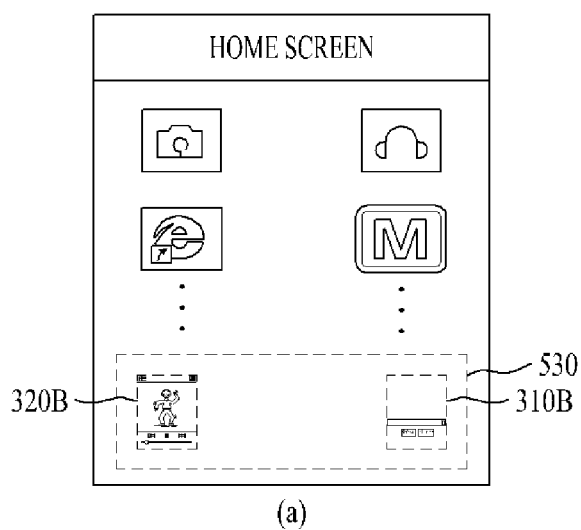
Figure 17:
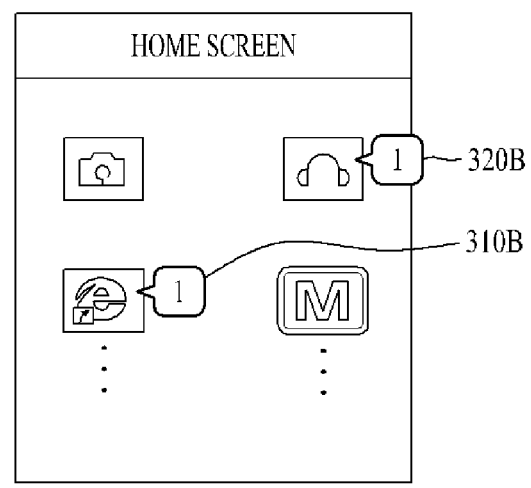
Figure 18:
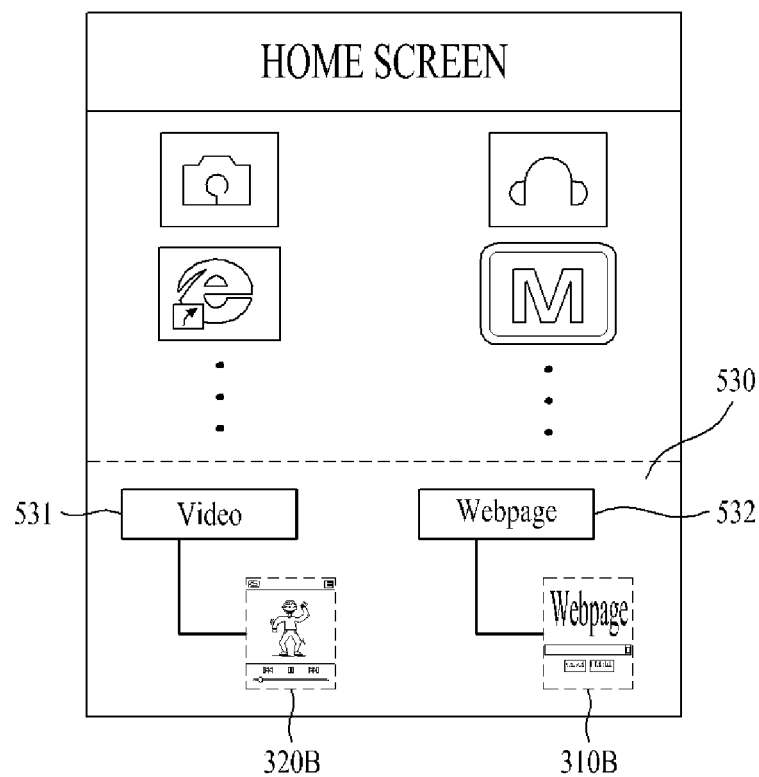
Figure 19:
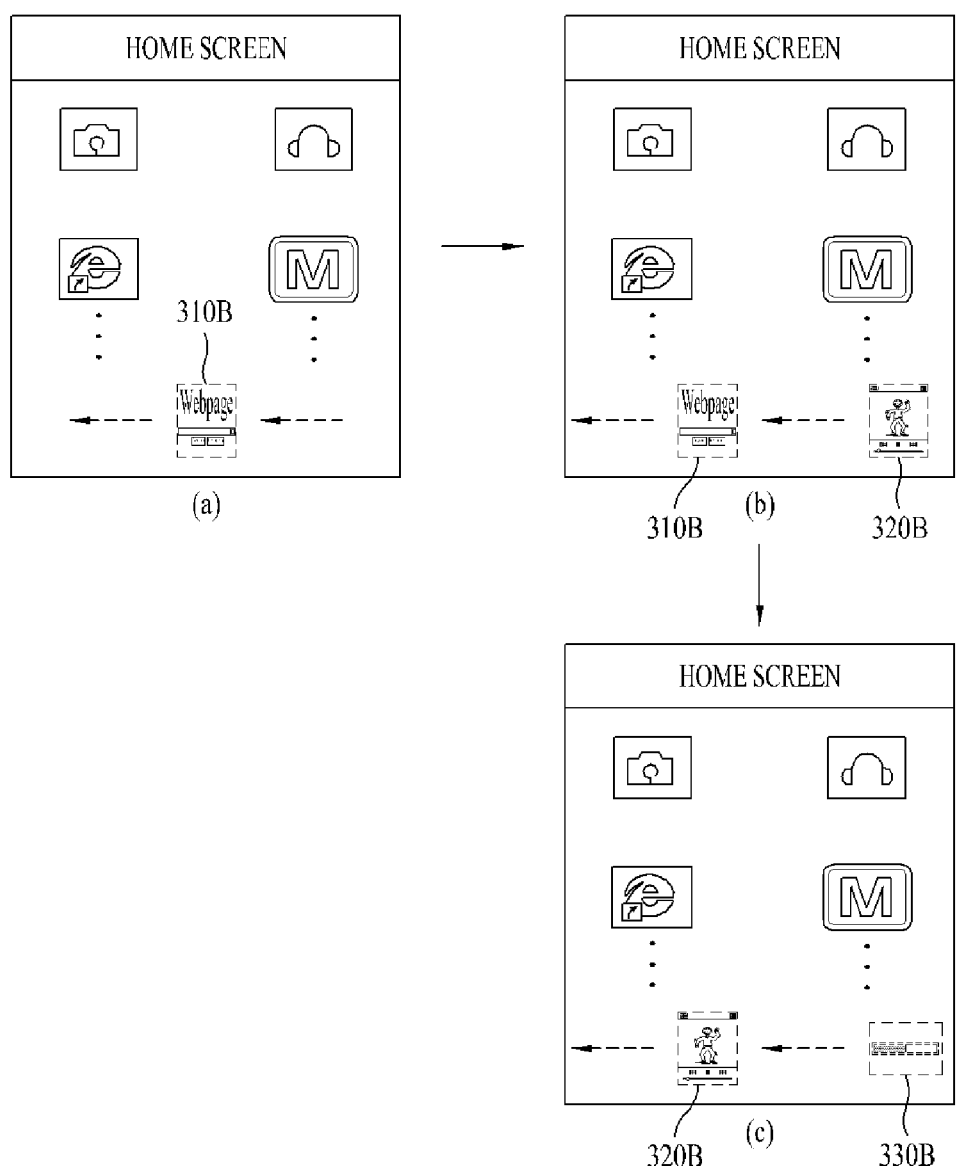

FIGS. 17 to 19 show a process for displaying at least two last memory widgets of the present invention.

FIG. 17 (a) shows a user interface (UI) 530 for storing the created last memory widgets 310B and 320B on a screen.

In particular, the controller 180 controls the UI 530 to be displayed on the screen, sorts the currently created last memory widgets 310B and 320B via the UI 530, and then controls the sorted last memory widgets to be stored. The UI 530 may be displayed as a box or a tray and a size of the UI 530 may be adjustable on the screen.

Moreover, a position of the UI 530 may be shiftable on the screen. In particular, the size of the UI 530 may be extended or reduced to correspond to a user's pinching-in touch (e.g., a touch of pinching in two points on the UI 530) or a user's pinching-out touch (e.g., a touch of pinching out two points on the UI 530). Moreover, the UI 530 may be shiftable in a direction corresponding to a drag touch having the user's specific directionality.

The UI 530 may be displayed transparent to facilitate identification of information displayed on a part overlapping with the UI 530 on the screen. A user may be able to adjust transparency of the UI 530.

The UI 530 may also be editable by at least one method described with reference to FIG. 12. For instance, if a command for deleting the UI 530 is input, the controller 180 may delete the UI 530 and the last memory widgets 310B and 320B included in the UI 530 together.

If a command for storing the UI 530 is input, the controller 180 may control the UI 530 and the last memory widgets 310B and 320B included in the UI 530 to be stored as compressed files. If a name of the UI 530 is inputted by a user, the controller 180 may determine the inputted name as a name of the UI 530 or may change the name of the UI 530.

Referring to FIG. 17 (b), if at least two last memory widgets 310B and 320B are created, the controller 180 may switch a current operation mode screen to a home screen containing a plurality of application widgets and may control information indicating the last memory widgets 310B and 320B to be displayed on the application widgets within the home screen. In particular, the controller 180 obtains categories of the created last memory widgets 310B and 320B and categories of the applications within the home screen and may control the information indicating the last memory widgets 310B and 320B of the same categories to be displayed on the applications having the same categories of the last memory widgets 310B and 320B.

For instance, referring to FIG. 17 (b), the $1^{st}$ last memory widget 310B has a webpage category, the $2^{nd}$ last memory widget 320B has a multimedia category, and a web browser application and a multimedia play application are included in the home screen. In particular, since each of the $1^{st}$ last memory widget 310B and the web browser application has the category related to the web, the controller 180 may control information indicating the $1^{st}$ last memory widget 310B to be displayed on the web browser application.

Referring to FIG. 17 (b), the information may include information on the number of corresponding last memory widgets having the same category of the application or may include operating state information of content according to a corresponding last memory widget, as shown in FIG. 7. Since each of the $2^{nd}$ last memory widget 320B and the multimedia play application has the category related to multimedia, the controller 180 may control information indicating the $2^{nd}$ last memory widget 320B to be displayed on the multimedia player application.

Referring to FIG. 18, if at least two last memory widgets 310B and 320B are created, the controller 180 may sort and display the last memory widgets 310B and 320B per category. In particular, the controller 180 may be able to sort and display the last memory widgets 310B and 320B as a tree structure of category names 531 and 532 of the last memory widgets 310B and 320B.

Referring to FIG. 19, if at least two last memory widgets 310B and 320B are created, the controller 180 may scroll and display the last memory widgets 310B and 320B within a screen of the display unit 151. In particular, if it is impossible to display all the created last memory widgets 310B and 320B within a current screen, referring to FIG. 19 (a) to (c), the controller 180 may sequentially scroll and display the last memory widgets 310B and 320B in order of earliest creation.

Referring to FIGS. 20 to 33, while an editing mode of a webpage is operating, if the editing mode of the webpage is ended in an uncompleted status, the controller 180 may create and display a last memory widget to re-display the webpage by bookmarking an editing status of the webpage right before the ended point. If the last memory widget is selected, the controller 180 may re-display the editing status bookmarked webpage.

While a webpage is displayed, if a user inputs a command for activating an editing mode of the webpage via the user input unit 130 or the touchscreen 151, the controller 180 may activate the editing mode of the webpage. The controller 180 may provide a user interface (UI) for editing the webpage and a user may be able to edit the webpage by manipulating the UI in order to set data to add to the webpage and output information indicating a method of outputting the data to the webpage.

While the editing mode is active, if the editing mode of the webpage is ended in an uncompleted status, the controller 180 creates a last memory widget for re-displaying the webpage edited right before the ended point. The controller 180 maps the created last memory widget, data and output information ser via the UI right before the ended point and address information of the edited webpage together, and then saves them in the memory 160.

After the last memory widget has been displayed, if the last memory widget is selected, the controller 180 may search the memory 160 for the data and output information mapped to the selected last memory widget and the address information of the edited webpage. The controller 180 may then re-display the edited webpage right before the ended point based on the data and output information and the address information of the webpage.

Figure 20:
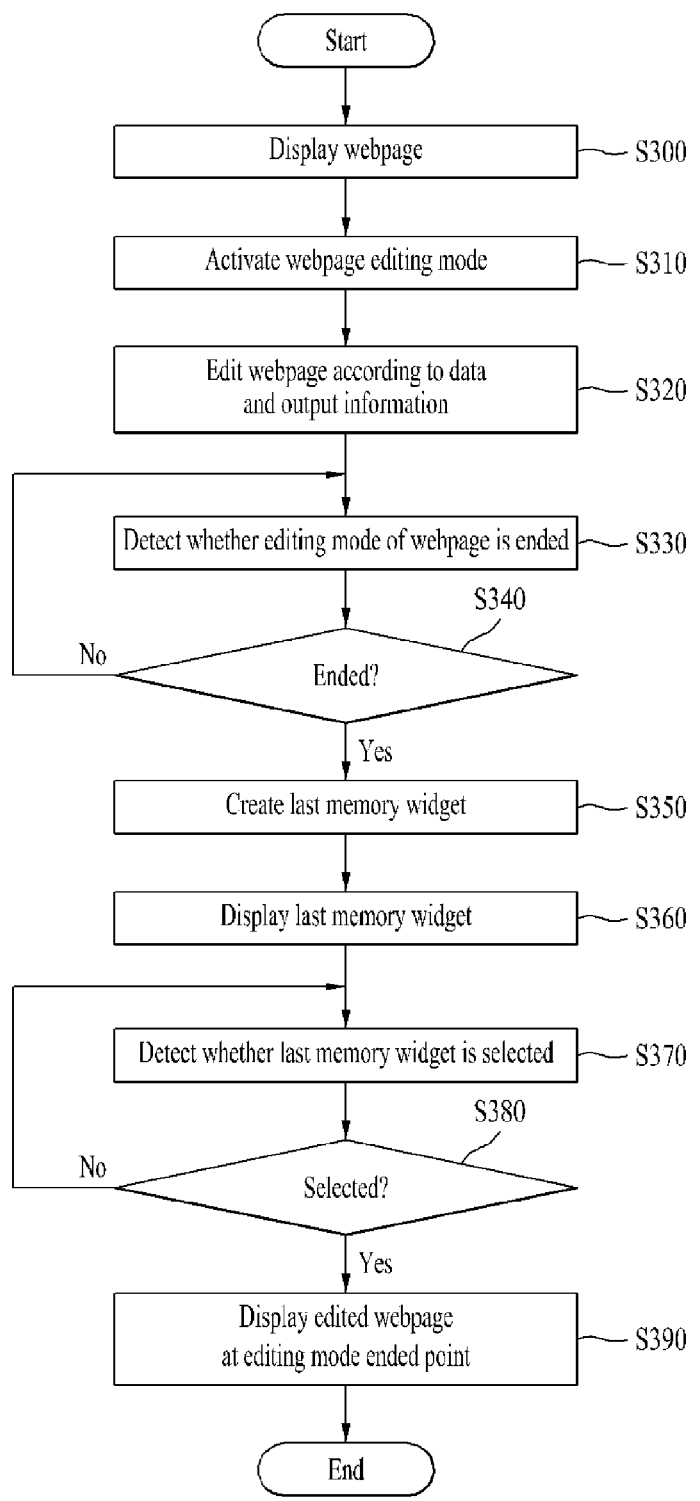
FIG. 20 is a flowchart of a process for re-displaying a webpage ended in the course of an editing operation using a last memory widget according to the present invention.

FIG. 20 is a flowchart of a process for re-displaying a webpage ended in the course of an editing operation using a last memory widget according to the present invention. Referring to FIG. 20, the controller 180 may access a webpage selected by a user via the wireless communication unit 110 and may then display the webpage [S300].

If a user inputs a command for activating an editing mode of the webpage via the user input unit 130 or the touchscreen 151, the controller 180 may activate the editing mode of the webpage [S310]. If the editing mode is activated, the controller 180 may display a UI for editing the webpage and may then receive data to be added to the webpage from the user via the UI.

If an output information indicating a method of outputting the data input to the webpage is received, the controller 180 may edit the webpage in accordance with the received data and the received output information [S320]. A process for editing the webpage in accordance with the received data and output information in the editing mode shall be described with reference to FIG. 21.

As mentioned in the foregoing description, the controller 180 may monitor whether the editing mode is ended in the course of the active editing mode of the webpage [S330]. In particular, the controller 180 may monitor whether a user inputs a command for ending the operation of the editing mode of the webpage via the user input unit 130 or the touchscreen 151.

The controller 180 may monitor whether the editing mode is forced to end due to occurrence of an operation failure (or malfunction) of the mobile terminal 100. The controller 180 may monitor whether the editing mode is forced to end due to occurrence of an operation failure of a web browser of the webpage or an application for providing the editing mode or an occurrence of an operation failure of an operating system (OS). The controller 180 may monitor whether the editing mode is forced to be ended as the webpage is forced to end due to occurrence of an error of the webpage. The controller 180 may monitor whether an interrupt occurs that corresponds to the last memory widget creation condition described with reference to FIG. 3 and FIG. 4.

If the controller 180 determines that the editing mode operation of the webpage is ended [S340], the controller 180 may create a last memory widget to re-display the edited webpage right before ending the editing mode of the webpage [S350]. The controller 180 may map the created last memory widget, data and output information set via the UI right before the ended point, and address information of the edited webpage together and may save them in the memory 160.

The controller 180 may display the created last memory widget [S360] and may then monitor whether the displayed last memory widget is selected [S370]. If the displayed last memory widget is selected [S380], the controller 180 may search the memory 160 for the data and output information mapped to the selected last memory widget and the address information of the webpage and may then re-display the edited webpage right before the editing mode ended point based on the found data and output information and the found address information of the webpage [S390].

The controller 180 may control the created last memory widget to be displayed on a preset operation mode screen such as a webpage screen, a standby screen, a home screen containing a plurality of application icons, a user-desired screen, a power ON screen, a power OFF screen and the like. Even if the operation mode screen is changed or information displayed in a specific operation mode is changed, the controller 180 may keep displaying the created last memory widget.

Figure 21:
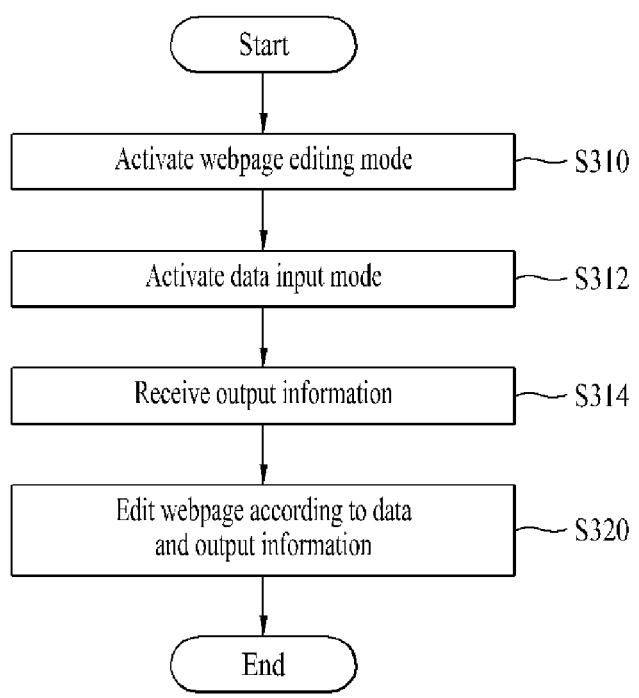
FIG. 21 is a flowchart illustrating an edit mode described with reference to FIG. 20.
Figure 22:
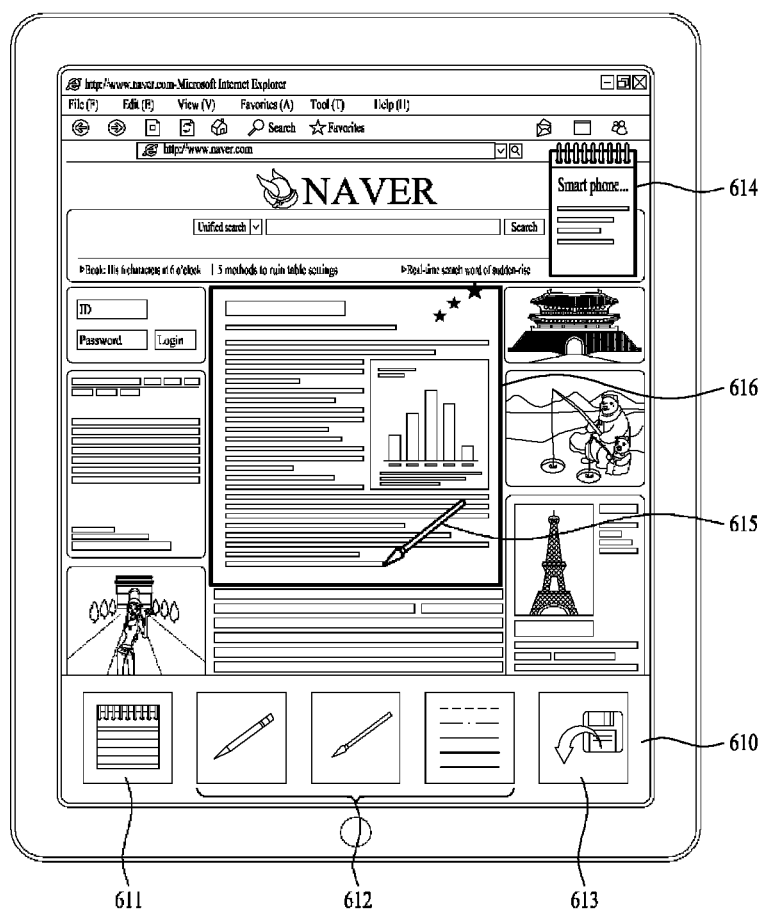
FIG. 22 is a diagram illustrating an input mode described with reference to FIG. 21.

A process for editing the webpage in accordance with the data and output information received in the editing mode [S310] will be described with reference to FIGS. 21 to 25. FIG. 21 is a flowchart for describing the editing mode [S310] described with reference to FIG. 20, FIG. 22 is a diagram for describing the data input mode [S312] described with reference to FIG. 21. FIGS. 23 to 28 are diagrams of screen configurations for describing the output information receiving step [S314] shown in FIG. 21.

If the editing mode of the webpage is activated [S310], the controller 180 may activate an input mode for receiving an input of data to be inserted in the webpage [S312]. If the data input mode is activated, referring to FIG. 22, the controller 180 may create and display a data input UI 610.

The controller 180 may receive an input of data via the data input UI 610 to be inserted in the webpage from a user. In particular, the data input UI 610 may include a $1^{st}$ sub UI 611 for receiving an input of text data, a $2^{nd}$ sub UI 612 for receiving an input of an image, and a $3^{rd}$ sub UI 613 for attaching data provided to the memory 160. The data received in the data input mode may include at least one of text, an image, audio, music, video and a document file and may further include all kinds of receivable data.

If a user selects the $1^{st}$ sub UI 611 for the text data input from the data input UI 610 to input text data to the webpage, the controller 180 may display a memo note 614 for inputting text data on the webpage. The user may be then be able to input desired text via the memo note 614.

If a user selects the $2^{nd}$ sub UI 612 for the image input from the data input UI 610 to draw a desired image on the webpage, the controller 180 may display an input tool 615 of a drawing tool such as a pencil, a brush and the like. The user may then be able to draw the desired image by manipulating the input tool 615. The data received via the input tool 615 may include image data such as an emphasizing indication 616 for emphasizing a substance of the webpage, a diagram and the like.

If a user selects the $3^{rd}$ sub UI 613 for the data attachment from the data input UI 610 to attach data saved in the memory 160 to the webpage, the controller 180 may search the data saved in the memory 160 for the data attachable to the webpage and may then display the found data as a list. The user may then be able to select the data desired to be attached to the webpage from the list.

Figure 23:
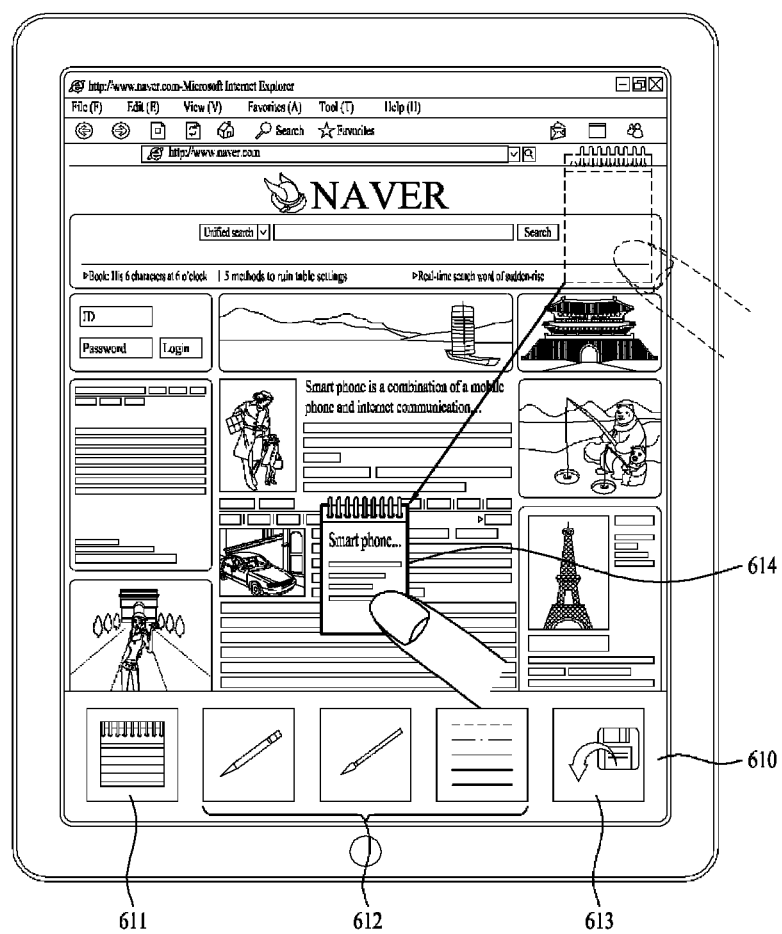
FIGS. 23 to 28 are diagrams illustrations a process for inputting information described with reference to FIG. 21.

A process for receiving the output information of the data input via the process shown in FIG. 22 shall be described with reference to FIGS. 23 to 25. If data is input in the data input mode, the controller 180 may receive the output information for outputting the received data to the webpage [S314].

The output information may be mainly classified into display information, play information and link information and may include information on a position, size and/or format of the received data to be outputted to the webpage. First, if the received data is one of a text, an image and a document, the display information is the information for displaying the received data on the webpage and may include position information for displaying the data received via the data input UI 610 on the webpage, size information for displaying the data received via the data input UI 610 on the webpage and the like.

The display information may be set by a user via the user input unit 130 or the touchscreen 151. A process for setting the display information is described with reference to FIG. 23. If a user drags a memo note, on which user inputted text is displayed, in an arrow direction via the touchscreen 151, the controller 180 may shift the memo note 614 in the arrow direction and may control the memo note 614 to be displayed at a position desired by the user.

Figure 24:
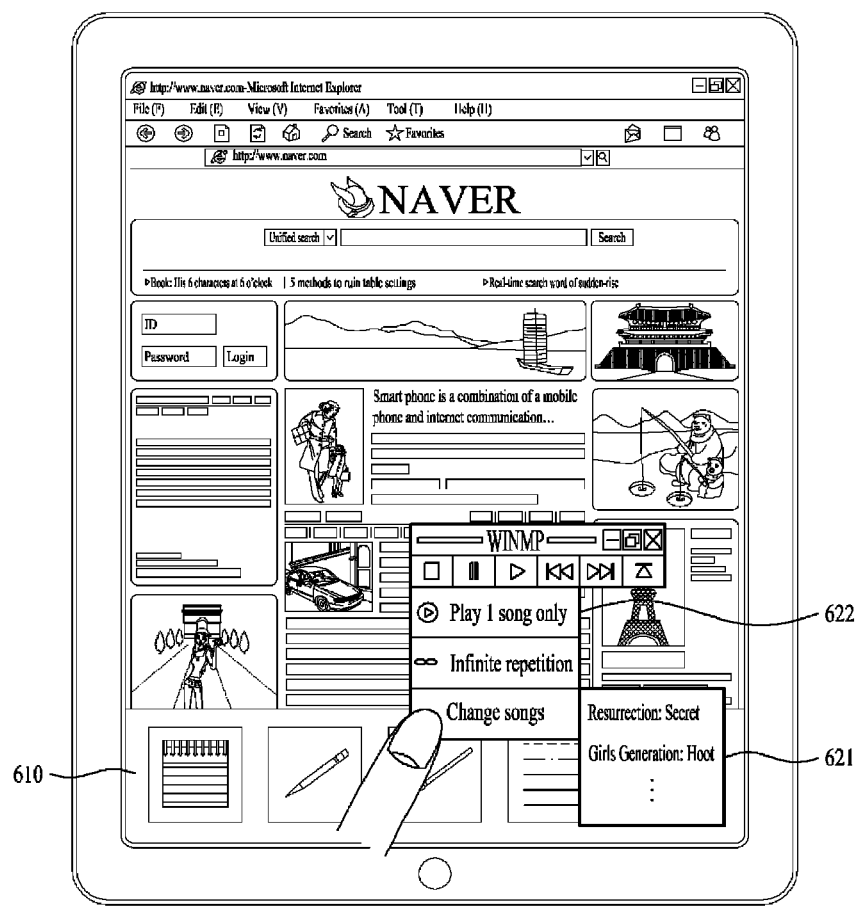
Figure 25:
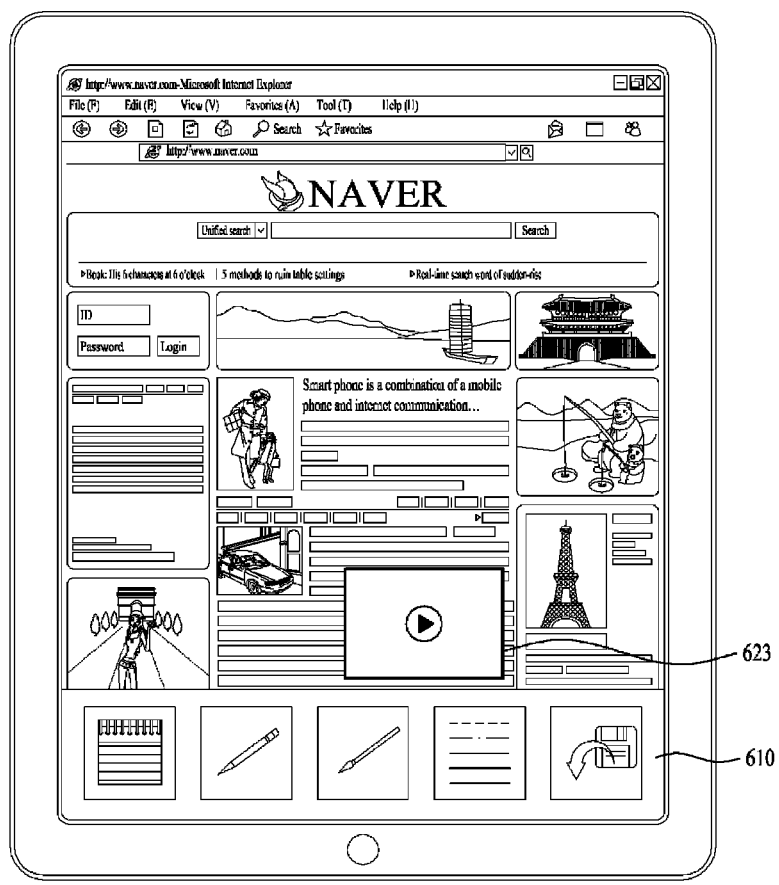

FIG. 24 and FIG. 25 are diagrams of a process for setting the play information.

If the data received in the step S312 of FIG. 21 includes multimedia such as audio, music, video, broadcast, game and the like, the play information of the output informations described with reference to FIG. 21 is information for playing the multimedia on the webpage.

The play information may enable the multimedia to be directly played on the webpage. Alternatively, after the information indicating the multimedia has been displayed as a mark or the like on the webpage, if the mark is selected, the play information may enable the multimedia to be played.

Referring to FIG. 24, the play information is set to the setting information for playing the multimedia on the webpage as a position, a count, a song selection and the like via play information setting windows 622 and 621. Referring to FIG. 25, the play information indicates that the multimedia is received via a specific mark 623.

Figure 26:
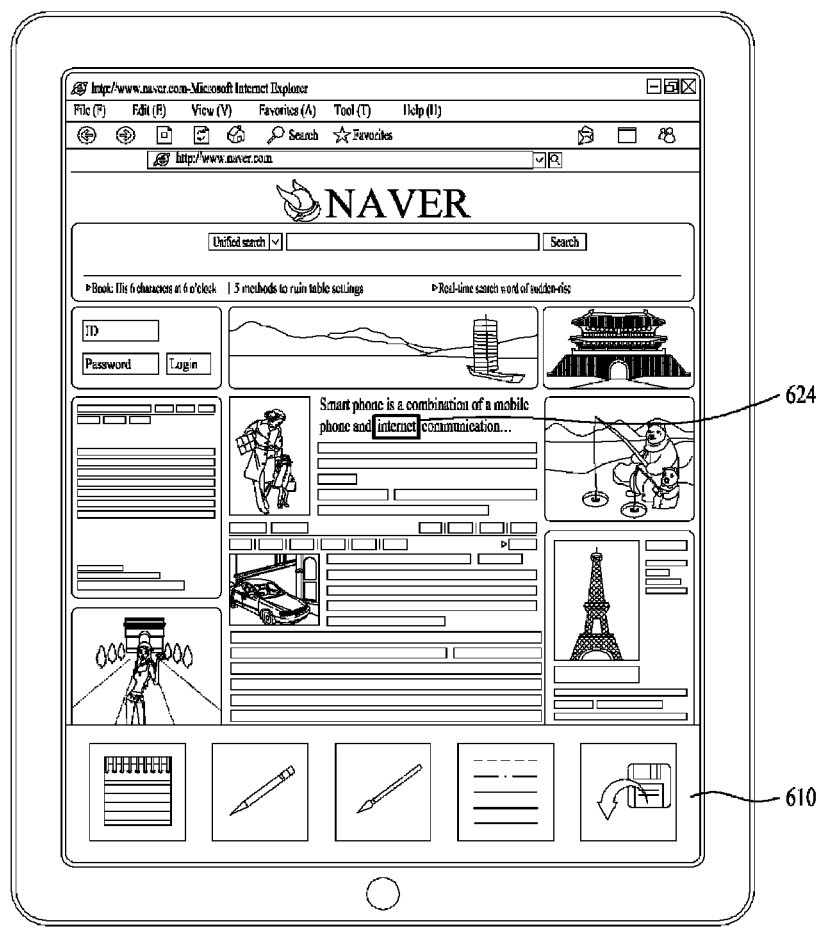
Figure 27:
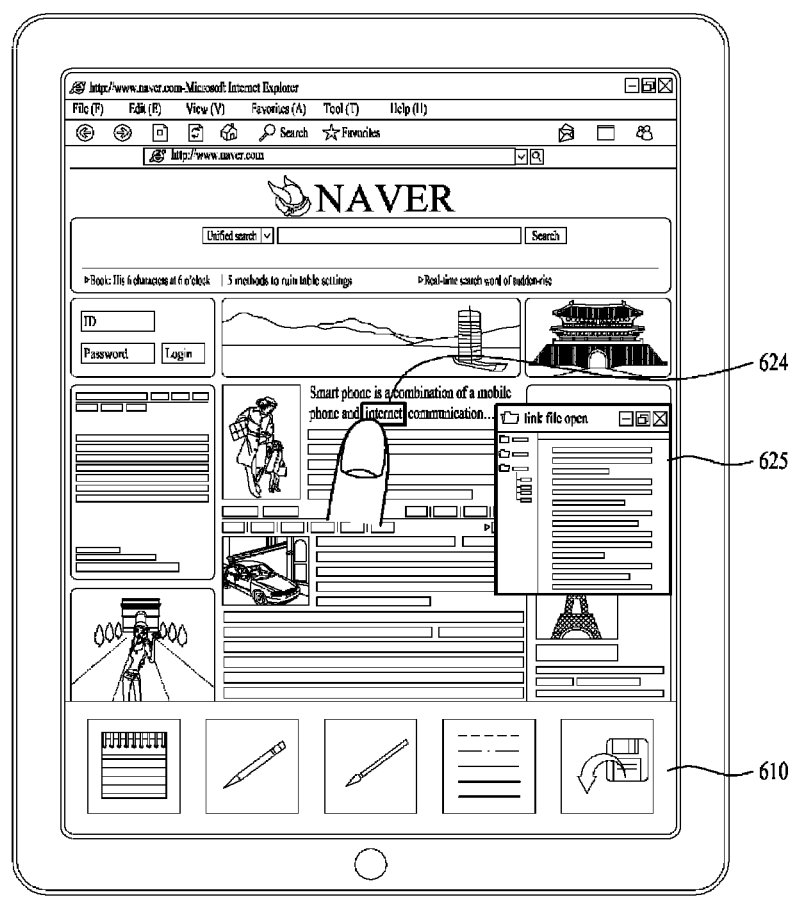
Figure 28:
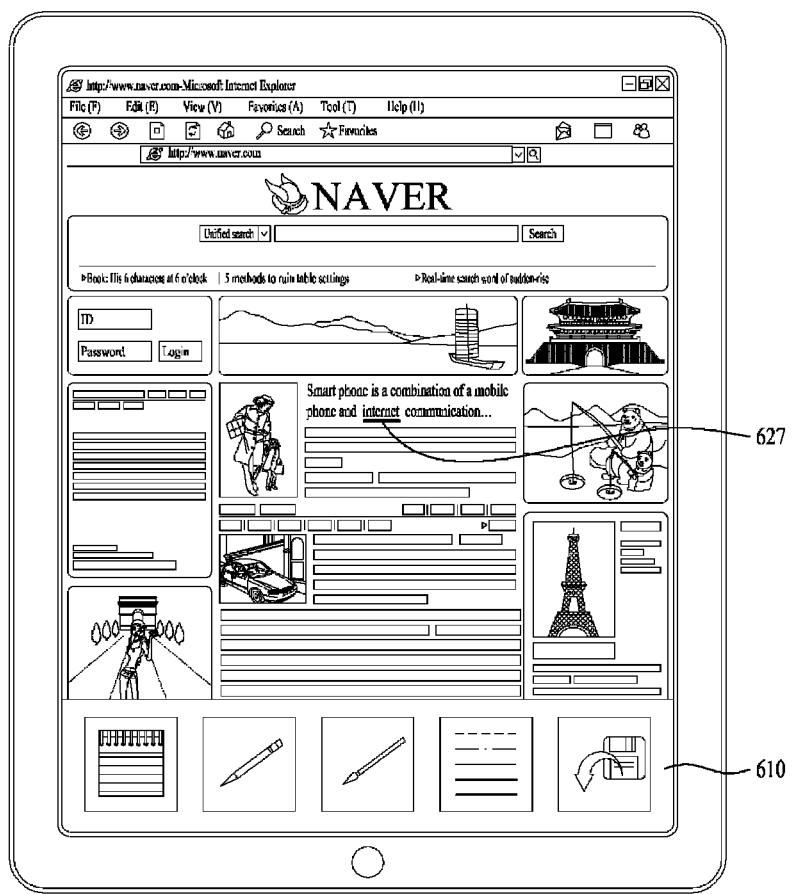

FIGS. 26 to 28 are diagrams of a process for setting the link information. The link information of the output informations may include information for linking the data, which is received via the $3^{rd}$ sub UI 613 for the data attachment in the data input UI 610, to a prescribed region of the webpage.

Referring to FIG. 26, if a prescribed region of the webpage is designated by a user via the user input unit 130 or the touchscreen 151, the controller 180 may display a boundary of the designated region as a box 624 such that it is identifiable from other regions. If the box 624 corresponding to the designated region is selected by a preset scheme (e.g., a long touch), the controller 180 may display data inserting window (e.g., a link file open window 625 in FIG. 27) to link to the box 624, may search the data saved in the memory 160 for the data linkable to the box 624, and may then display the found data as a list within the data inserting window 625.

The controller 180 may not initially display the list within the data inserting window 625. Instead, if the data inserting window 625 is selected, the controller 180 may search the data saved in the memory 160 for the data linkable to the box 624 and may then display a list including the found data.

If a user selects desired data from the list, the controller 180 may control the selected data to be linked to the box 624 corresponding to the designated region and the controller 180 may then display information 627, which indicates that the selected data is linked to the box 624 on the webpage.

Therefore, the controller 180 may enable the user to identify that the data is linked to the designated region. For instance, referring to FIG. 28, the data linked region is underlined, which is indicated by a reference number 627, to indicate that the data is linked to the designated region.

By the processes shown in FIGS. 21 to 28, the controller 180 activates the webpage editing mode, receives data, receives output information of the data, and edits the webpage to output the received data in accordance with the output information.

Figure 29:
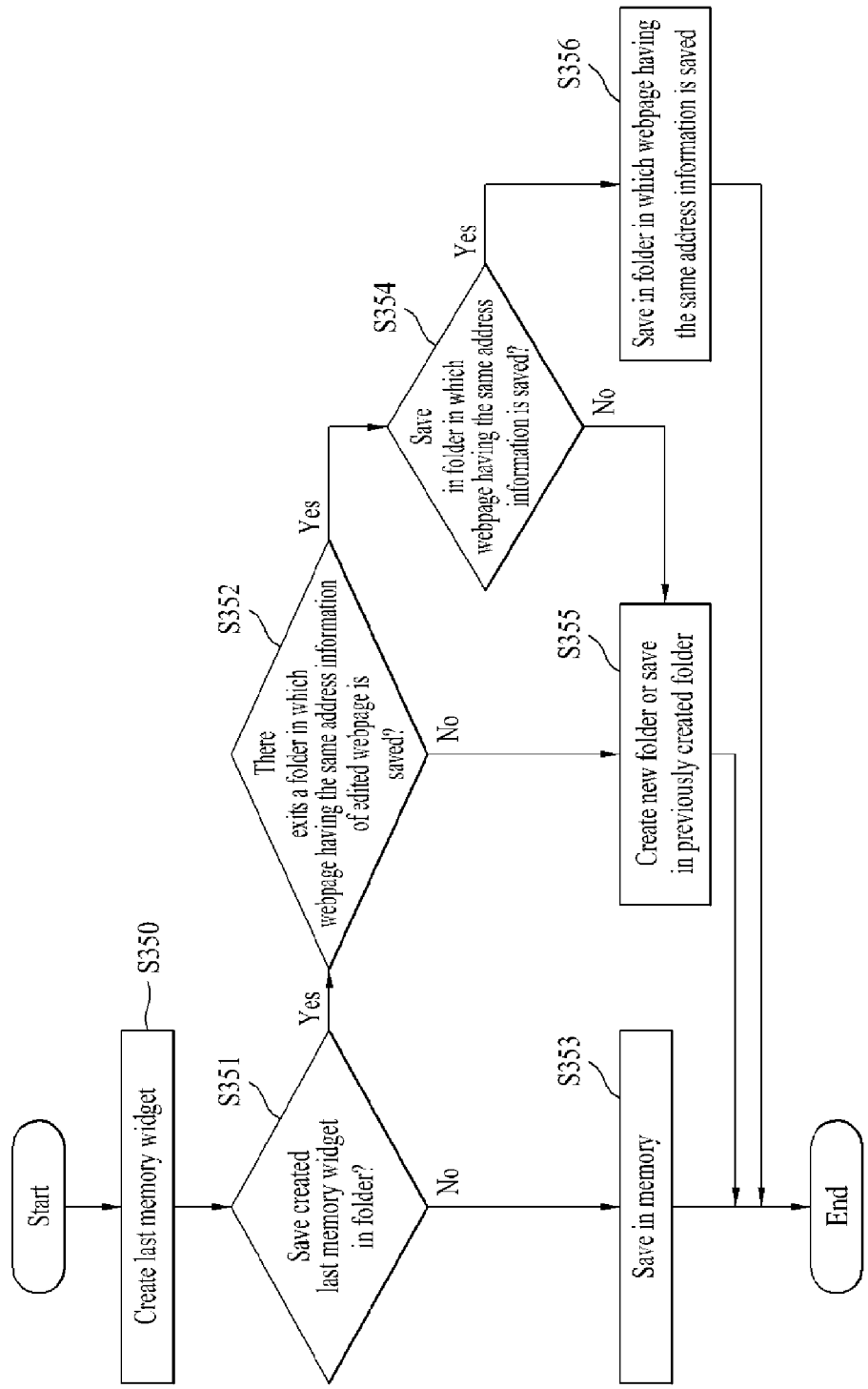
FIG. 29 is a flowchart of a process for keeping the last memory widget generated in FIG. 20.

A process for keeping the last memory widget created by the step S350 shown in FIG. 20 is explained with reference to FIG. 29. FIG. 29 is a flowchart of a process for keeping the last memory widget generated in FIG. 20.

Referring to FIG. 29, if a last memory widget is created the step S350 shown in FIG. 20 [S350], the controller 180 may save the created last memory widget in a folder within the memory 160 storing different last memory widgets or directly save it in the memory 160 without being saved in the folder in accordance with a user selection [S351, S353].

If the created last memory widget is saved in the folder, the controller 180 searches whether a folder storing a webpage having the same address of the edited webpage corresponding to the created last memory widget exists in the memory 160.

As a result of the search, if the folder storing a webpage having the same address of the edited webpage corresponding to the created last memory widget exists in the memory 160 [S352], the controller 180 may display a setting window for setting whether to save the created last memory widget in the found folder. If a user sets to save the created last memory widget in the found folder via the setting window [S354], the controller 180 may save the created last memory widget in the found folder [S356].

As mentioned in the foregoing description, according to the present invention, as the created last memory widget is saved in the folder string of a webpage having the same address of the corresponding edited webpage, webpages related to each other may be efficiently managed in one folder.

Meanwhile, if the folder storing the webpage having the same address of the edited webpage corresponding to the created last memory widget does not exist or a user selects to save the created last memory widget in another folder despite the existence of the corresponding folder, the controller 180 may save the created last memory widget in the folder selected by the user. Alternatively, the controller 180 may create a new folder and may save the created last memory widget in the new folder [S355].

A process for re-displaying the edited webpage corresponding to the last memory widget in the step S390 shown in FIG. 20 is explained in detail with reference to FIGS. 30 to 33. FIGS. 30 to 33 are diagrams of a process for re-displaying a webpage corresponding to the last memory widget described with reference to FIG. 20.

Figure 30:
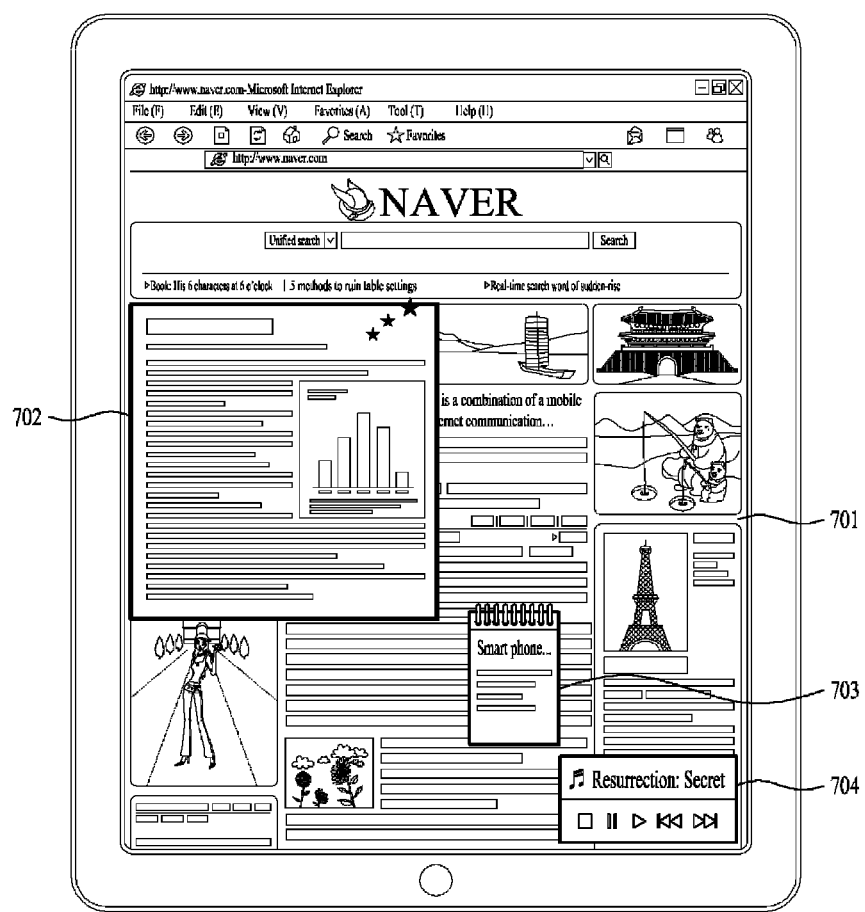
FIGS. 30 to 33 are diagrams of a process for re-displaying a webpage corresponding to the last memory widget described with reference to FIG. 20.
Figure 31:
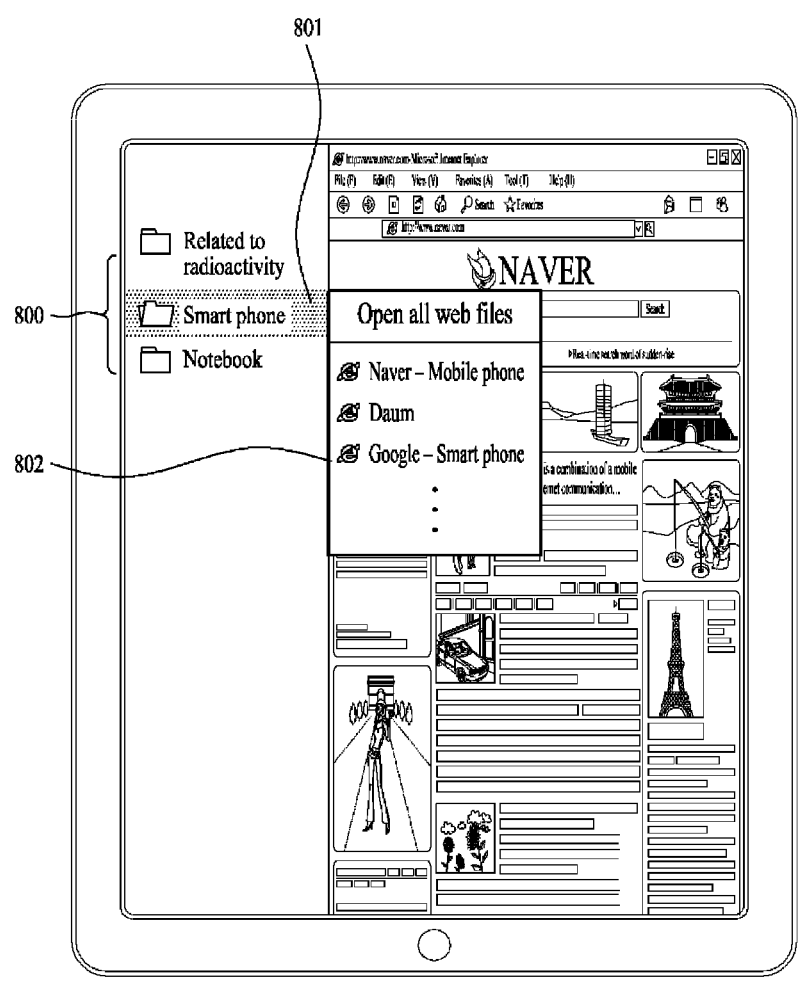

Referring to FIG. 30, while the last memory widget created the steps S300 to S380 shown in FIG. 20 is displayed, if the last memory widget is selected, the controller 180 may search the memory 160 for data and output information mapped to the selected last memory widget and address information of the webpage, the controller 180 may then display a webpage edited right before the editing mode ended point based on the found data and output information and the found address information of the webpage.

Referring to FIG. 30, the data included in the edited webpage may include image data 702 emphasizing a substance contained in the webpage, a memo note 703 for writing a memo of information related to the webpage or a play information window 704 for inserting multimedia in the webpage, as mentioned in the foregoing description with reference to FIGS. 22 to 28. As mentioned in the process described with reference to FIG. 29, if a plurality of last memory widgets are created and a plurality of the created last memory widgets are saved in folders 800, referring to FIG. 32, if a specific folder 801 is selected by a user, the controller 180 may display a list of the last memory widgets saved in the selected folder 801.

Figure 32:
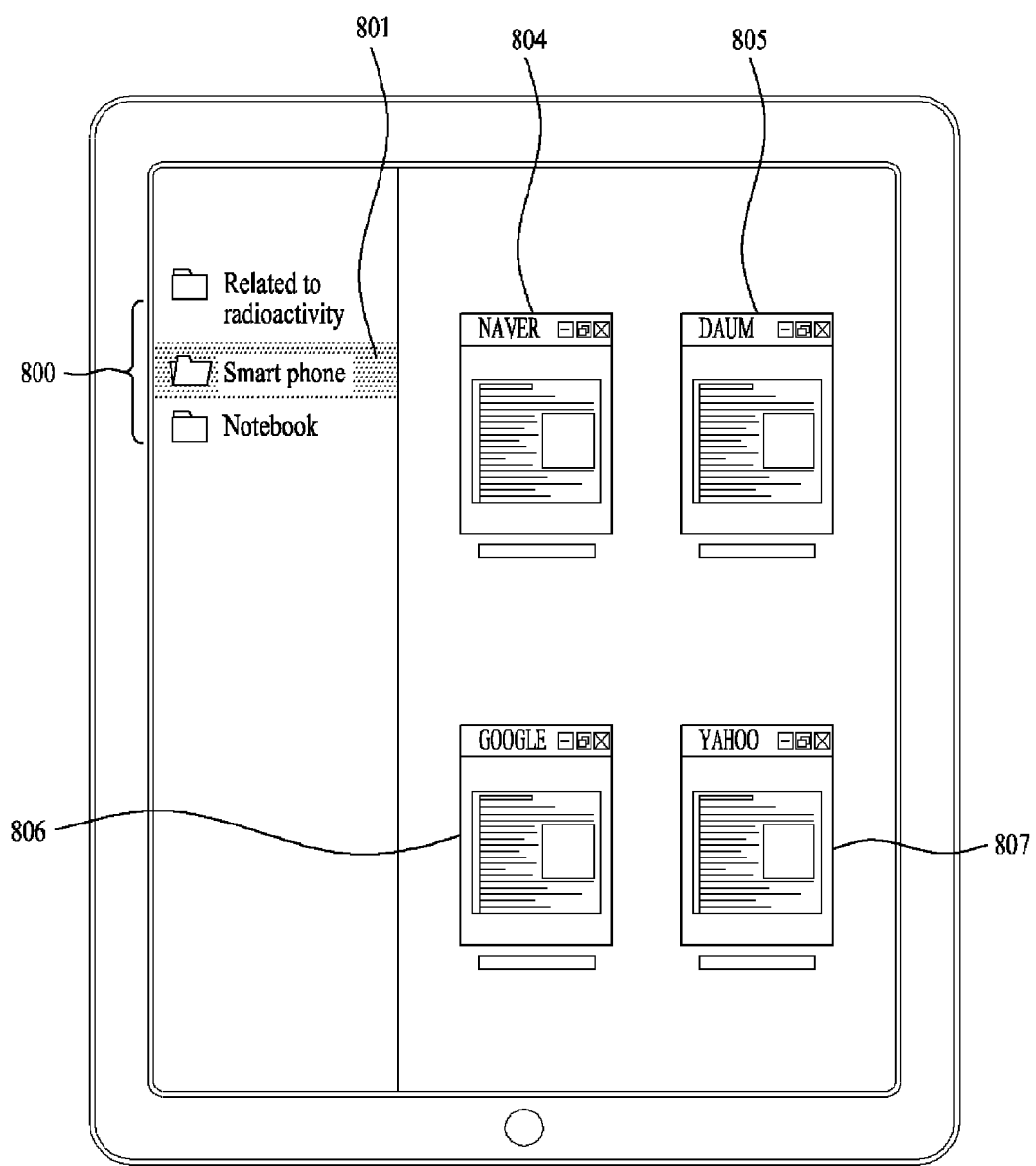

If a specific last memory widget is selected from the list, the controller 180 may display an edited webpage corresponding to the selected last memory widget. Referring to FIG. 32, if a plurality of last memory widgets are created and a plurality of the created last memory widgets are saved in folders 800, referring to FIG. 32, if a specific folder 801 is selected by a user, the controller 180 may display the last memory widgets saved in the folder 801 as thumbnails 804 to 807, respectively.

Figure 33:
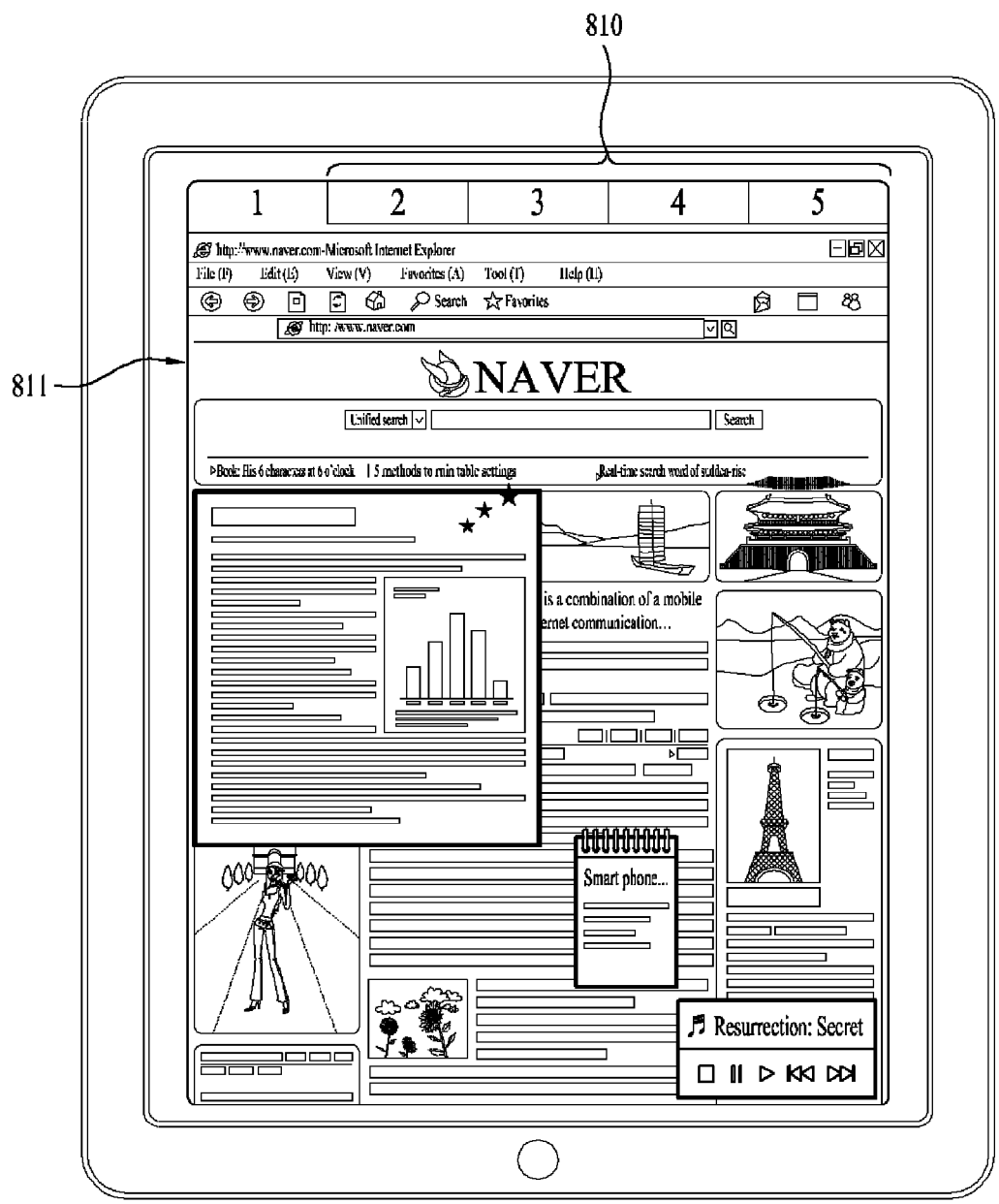

Referring to FIG. 33, if a plurality of last memory widgets are created and a plurality of the created last memory widgets are saved in folders 800, if a specific folder 801 is selected by a user, the controller 180 may display edited webpages corresponding to the last memory widgets saved in the folder 801 by tab browsing. The tab browsing means a browsing scheme of setting one webpage window as one tab, opening a plurality of webpage windows, and shifting the webpage window by clicking a corresponding tab.

The controller 180 may control the edited webpages corresponding to the last memory widgets saved in the folder 801 to be identifiably displayed with the tabs 810, respectively. If a prescribed one of the tabs 810 is selected by a user, the controller 180 may control the edited webpage 811 corresponding to the selected tab to be displayed.

Accordingly, the present invention provides several effects and/or advantages. First, even if an operation of a content is ended due to a user or an external factor, the present invention provides a user with a last memory widget, to which a function of playing back the content from an operation ended point, thereby enabling the user to play the content from the operation ended point using the last memory widget. Second, the present invention displays an operation status such as an image corresponding to an operation ended part of a content, an end time of the content, a played position of the content and the like within a last memory widget, thereby facilitating a user to recognize a status of the currently operation-interrupted content. Third, the present invention displays a last memory widget and then informs a user of an occurrence of the last memory widget at a predetermined rate, thereby enabling the user to recognize that a currently operating content is ended.

It will be apparent to those skilled in the art that various modifications and variations can be specified into other form(s) without departing from the spirit or scope of the inventions. For instance, the above-described methods can be implemented in a program recorded medium as computer-readable codes.

The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a memory configured to store content;
a display unit configured to display an operating screen of the content when the content is activated; and
a controller configured to:
control the display unit to display a menu for setting a creation condition of an item for re-activating the content from an execution ended point of the content;
set the creation condition via the displayed menu, the set creation condition including at least one specific status of the mobile terminal;
create the item when execution of the content is ended in an uncompleted status and a current status of the mobile terminal is identical to the at least one specific status of the mobile terminal;
store the created item in the memory;
control the display unit to display the created item; and
re-activate the content corresponding to a displayed item from a corresponding execution end point when the displayed item is selected.

2. The mobile terminal of claim 1, wherein the controller is further configured to:
recognize operation status information corresponding to a portion of the content ended in an uncompleted status;
map the recognized operation status information and the item to each other;
save the mapped information and item in the memory; and
reactivate the content based on operation status information mapped to the selected displayed item.

3. The mobile terminal of claim 2, wherein the controller is further configured to control the display unit to display the operation status information within the selected displayed item.

4. The mobile terminal of claim 1, wherein:
the memory is further configured to store a setting value including a creation condition and display condition of the item; and
the controller is further configured to create the item based on the creation condition and control the display unit to display the created item based on the display condition.

5. The mobile terminal of claim 1, wherein the controller is further configured to control the display unit to no longer display the item if the displayed item is not selected within a predetermined period of time or the content corresponding to the displayed item is reactivated.

6. The mobile terminal of claim 1, wherein the controller is further configured to:
switch an operation mode of the mobile terminal to a preset operation mode when the content is ended in the operation uncompleted status; and
control the display unit to display the item within a screen according to the preset operation mode.

7. The mobile terminal of claim 1, wherein the controller is further configured to control the display unit to maintain the display of the item when information displayed on a screen of the display unit is changed.

8. The mobile terminal of claim 1, wherein:
the item comprises instant information to be deleted after a predetermined period of time; and
the controller is further configured to switch the instant information to stationary information that cannot be deleted when a command for switching the instant information to the stationary information is received.

9. The mobile terminal of claim 8, wherein the controller is further configured to control the display unit to shift the displayed item with the switched information into a home screen including a plurality of applications.

10. The mobile terminal of claim 1, wherein the controller is further configured to:
control the display unit to display a user interface (UI) for editing the displayed item according to at least one scheme when a command for editing the displayed item is received; and
apply the at least one scheme to the displayed item when the at least one scheme is set via the UI.

11. The mobile terminal of claim 1, wherein the controller is further configured to not create the item when a total number of previously-created items exceeds a preset creation grant.

12. The mobile terminal of claim 11, wherein the controller is further configured to:

delete an earliest-created one of the previously-created items; and create the item.

13. The mobile terminal of claim 1, wherein the controller is further configured to control the display unit to:

display a user interface (UI) for keeping the created item; and display the created item within the UI.

14. The mobile terminal of claim 1, wherein the controller is further configured to:

sort previously-created items and the created item; and control the display unit to display the sorted previously-created items and created item according to category.

15. The mobile terminal of claim 1, wherein the controller is further configured to control the display unit to scroll and display previously-created items and the created item.

16. The mobile terminal of claim 1, wherein the controller is further configured to control the item to be transmitted to a received contact.

17. The mobile terminal of claim 1, wherein the controller is further configured to:

create an item for re-displaying an edited webpage when an activated editing mode of the webpage is ended in an uncompleted status and a current status of the mobile terminal is identical to the at least one specific status of the mobile terminal;

save the created item for re-displaying the edited webpage in the memory;

control the display unit to display the created item for re-displaying the edited webpage; and output the edited webpage corresponding to the item for re-displaying the edited webpage when the displayed item for re-displaying the edited webpage is selected.

18. The mobile terminal of claim 17, wherein the controller is further configured to:

control the display unit to display a user interface (UI) for setting data to add to the edited webpage and information indicating an output scheme of data on the webpage;

map the data, the information and the item for re-displaying the edited webpage together and save the mapped data, information and item for re-displaying the edited webpage in the memory when the data and output information are set via the UI; and output the data mapped to a selected item for re-displaying the edited webpage when the displayed item for re-displaying the edited webpage is selected, the data output to the edited webpage according to the corresponding information.

19. A method of controlling a mobile terminal, the method comprising:

displaying a menu on a display unit of the mobile terminal, the menu for setting a creation condition of an item for re-activating content from an execution ended point of the content;

setting the creation condition via the displayed menu, the creation condition including at least one specific status of the mobile terminal;

storing the creation condition in memory of the mobile terminal;

executing the content when a command for executing the content is received;

creating the item when the execution of the content is ended in an uncompleted status and a current status of the mobile terminal is identical to the at least one specific status of the mobile terminal;

displaying the created item; and re-activating the content corresponding to a displayed item from a corresponding execution ended point when the displayed item is selected.

* * * * *